US012802383B2

(12) United States Patent
Hirata

(10) Patent No.: US 12,802,383 B2
(45) Date of Patent: Nov. 17, 2026

(54) BIOMETRIC AUTHENTICATION DEVICE, BIOMETRIC AUTHENTICATION METHOD, AND BIOMETRIC AUTHENTICATION SYSTEM

(71) Applicant: PANASONIC INTELLECTUAL PROPERTY MANAGEMENT CO., LTD., Osaka (JP)

(72) Inventor: Keiji Hirata, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 56 days.

(21) Appl. No.: 18/860,554

(22) PCT Filed: Mar. 24, 2023

(86) PCT No.: PCT/JP2023/012049
§ 371 (c)(1),
(2) Date: Aug. 11, 2025

(87) PCT Pub. No.: WO2023/210231
PCT Pub. Date: Nov. 2, 2023

(65) Prior Publication Data

US 2025/0371836 A1 Dec. 4, 2025

(30) Foreign Application Priority Data

Apr. 28, 2022 (JP) ................................ 2022-075296

(51) Int. Cl.

| | |
|---|---|
| ***G06F 21/32*** | (2013.01) |
| ***G06V 10/141*** | (2022.01) |
| ***G06V 40/12*** | (2022.01) |
| ***G06V 40/13*** | (2022.01) |
| ***G06V 40/50*** | (2022.01) |
| ***H04N 23/74*** | (2023.01) |

(52) U.S. Cl.
CPC ............ *G06V 10/141* (2022.01); *G06F 21/32* (2013.01); *G06V 40/1318* (2022.01);
(Continued)

(58) Field of Classification Search
CPC ............. G06V 10/141; G06V 40/1318; G06V 40/1365; G06V 40/50; G06V 40/1312;
(Continued)

(56) References Cited

U.S. PATENT DOCUMENTS

| | | | |
|---|---|---|---|
| 9,672,406 B2 | 6/2017 | Hatcher, II et al. | |
| 2004/0208348 A1* | 10/2004 | Baharav | G06F 3/0421 382/124 |

(Continued)

FOREIGN PATENT DOCUMENTS

| | | |
|---|---|---|
| JP | 2004-280383 | 10/2004 |
| JP | 2008-005081 | 1/2008 |

(Continued)

OTHER PUBLICATIONS

International Search Report (ISR) from International Searching Authority (Japan Patent Office) in International Pat. Appl. No. PCT/JP2023/012049, dated Jun. 13, 2023, together with an English language translation.

(Continued)

*Primary Examiner* — Abdul-Samad A Adediran
(74) *Attorney, Agent, or Firm* — Greenblum & Bernstein, P.L.C.

(57) ABSTRACT

A biometric authentication device includes: an imaging unit configured to capture an image of a hand of a person to be authenticated; an illumination unit configured to illuminate the hand of the person to be authenticated; a control unit configured to control at least one of the imaging unit or the illumination unit based on a plurality of different exposure parameters; and an authentication unit configured to extract biometric information of the person to be authenticated from each of a plurality of captured images, and authenticate the person to be authenticated based on the biometric information of the person to be authenticated and previously regis-
(Continued)

tered biometric information of each of a plurality of persons to be authenticated. The plurality of captured images are captured by the imaging unit according to each of the exposure parameters.

13 Claims, 18 Drawing Sheets

(52) U.S. Cl.
CPC .......... *G06V 40/1365* (2022.01); *G06V 40/50* (2022.01); *H04N 23/74* (2023.01)

(58) Field of Classification Search
CPC ....... H04N 23/74; G06F 21/32; G06F 3/0421; G01N 21/01
USPC .......................................... 250/332; 382/124
See application file for complete search history.

(56) References Cited

U.S. PATENT DOCUMENTS

| | | | | |
|---|---|---|---|---|
| 2009/0134328 | A1* | 5/2009 | Yamaguchi | G06V 40/1312 250/332 |
| 2017/0262693 | A1 | 9/2017 | Aoki | |
| 2018/0336428 | A1* | 11/2018 | Ichige | G01N 21/01 |
| 2019/0065710 | A1 | 2/2019 | Hama et al. | |

FOREIGN PATENT DOCUMENTS

| | | |
|---|---|---|
| JP | 2008-262599 | 10/2008 |
| JP | 2017-162302 | 9/2017 |
| JP | 2019-040472 | 3/2019 |

OTHER PUBLICATIONS

Extended European Search Report (EESR) from European Patent Office (EPO) in European Patent Appl. No. 23795978.8, dated Apr. 10, 2025.

Perera, R. A. H., "Finger-Adaptive Illumination Control and Exposure Fusion Imaging for Biometric Finger Vein Recognition," Jan. 1, 2019, available at https://essay.utwente.nl/78719/1/Pererea BA EEMCS.pdf.

Extended European Search Report (EESR) from European Patent Office (EPO) in European Patent Appl. No. 23795978.8, dated Mar. 25, 2026.

Office Action from European Patent Office (EPO) in European Patent Appl. No. 23795978.8, dated Mar. 25, 2026.

* cited by examiner

*FIG. 9*

TB1

| EXPOSURE CONDITION | n-th SHUTTER SPEED CONDITION | SHUTTER SPEED (μs) |
|---|---|---|
| 1 | n=0 | 20 |
| 2 | n=1 | 25 |
| 3 | n=2 | 35 |
| 4 | n=3 | 50 |
| ⋮ | ⋮ | ⋮ |
| k+1 | n= k | 150 |

*FIG. 12*

TB2

| EXPOSURE CONDITION | n-th ILLUMINATION CONDITION | ILLUMINATION LIGHT EMISSION TIME (μs) |
|---|---|---|
| 1 | n=0 | 20 |
| 2 | n=1 | 25 |
| 3 | n=2 | 35 |
| 4 | n=3 | 50 |
| ⋮ | ⋮ | ⋮ |
| m+1 | m=k | 150 |

FIG. 17

TB3

| | FIRST EMBODIMENT | MODIFICATION OF FIRST EMBODIMENT |
|---|---|---|
| AUTHENTICATION DEVICE B1 | STEPS St1 - 1 TO St6 - 2 | — |
| BIOMETRIC INFORMATION ACQUIRING DEVICE B1A | — | STEPS St1 - 1 TO St5 - 2 |
| AUTHENTICATION DEVICE P1 | — | STEPS St6 - 1 AND St6 - 2 |
| MONITOR MN | STEPS St7 - 1 AND St7 - 2 | STEPS St7 - 1 AND St7 - 2 |

BIOMETRIC AUTHENTICATION DEVICE, BIOMETRIC AUTHENTICATION METHOD, AND BIOMETRIC AUTHENTICATION SYSTEM

TECHNICAL FIELD

The present disclosure relates to a biometric authentication device, a biometric authentication method, and a biometric authentication system.

BACKGROUND ART

Patent Literature 1 discloses a biometric authentication device that acquires a plurality of sets of palm images with light emitted from an illumination under a plurality of different irradiation conditions of the illumination, adjusts a time interval at which the image sets are acquired, in accordance with an imaging condition, extracts a biometric feature from each of the plurality of image sets, and collates the extracted biometric feature with a registered biological feature registered previously.

CITATION LIST

Patent Literature

Patent Literature 1: JP2017-162302A

SUMMARY OF INVENTION

Technical Problem

An image used for biometric authentication is preferably captured under more appropriate illumination conditions in order to prevent a decrease in extraction accuracy of biometric information and in biometric authentication accuracy using the biometric information. However, in the configuration disclosed in Patent Literature 1, biometric authentication is executed by using the image sets captured at adjusted time intervals and under a plurality of different irradiation conditions of the illumination. Accordingly, there is a possibility that the biometric authentication device cannot acquire image sets captured under all irradiation conditions of the illumination depending on the adjusted time intervals, a speed at which a user moves his/her palm, and the like. In addition, in the related art, in synchronization control between the illumination and a camera during high-speed imaging, it is difficult to control the ON and OFF of the illumination in accordance with an imaging timing of the camera.

The present disclosure has been made in view of the above circumstances, and an object thereof is to provide a biometric authentication device, a biometric authentication method, and a biometric authentication system for capturing an image more suitable for biometric authentication.

Solution to Problem

The present disclosure provides a biometric authentication device including: an imaging unit configured to capture an image of at least a part of a hand of a person to be authenticated; an illumination unit configured to illuminate the hand of the person to be authenticated; a control unit configured to control at least one of the imaging unit or the illumination unit based on a plurality of different exposure parameters; and an authentication unit configured to extract biometric information of the person to be authenticated from each of a plurality of captured images, and authenticate the person to be authenticated based on the biometric information of the person to be authenticated and previously registered biometric information of each of a plurality of persons to be authenticated, in which the plurality of captured images are captured by the imaging unit according to each of the exposure parameters.

The present disclosure provides a biometric authentication method performed by a biometric authentication device, the biometric authentication device being configured to execute biometric authentication of a person to be authenticated, the biometric authentication method including: controlling at least one of a camera or an illumination based on a plurality of different exposure parameters; capturing an image of at least a part of a hand of the person to be authenticated according to each of the exposure parameters; extracting biometric information of the person to be authenticated from each of a plurality of captured images; and authenticating the person to be authenticated based on the biometric information of the person to be authenticated and previously registered biometric information of each of a plurality of persons to be authenticated.

The present disclosure provides a biometric authentication system including: a biometric information acquiring device configured to acquire biometric information of a person to be authenticated; and an authentication device configured to communicate with the biometric information acquiring device, in which the biometric information acquiring device is configured to control at least one of a camera or an illumination based on a plurality of different exposure parameters, capture an image of at least a part of a hand of the person to be authenticated according to each of the exposure parameters, and acquire the biometric information of the person to be authenticated from each of a plurality of captured images, and transmit the biometric information to the authentication device, and the authentication device is configured to authenticate the person to be authenticated based on the biometric information of the person to be authenticated transmitted from the biometric information acquiring device and previously registered biometric information of each of a plurality of persons to be authenticated.

Advantageous Effects of Invention

According to the present disclosure, a captured image more suitable for biometric authentication can be captured.

BRIEF DESCRIPTION OF DRAWINGS

FIG. 9 is a table illustrating an example of a shutter speed condition in the authentication device.

FIG. 12 is a table illustrating an example of a second exposure condition (illumination condition) in the authentication device.

FIG. 17 is a table illustrating a correspondence relationship between operation procedures illustrated in FIGS. 7 and 11 and operation procedures of the biometric authentication system according to each embodiment.

DESCRIPTION OF EMBODIMENTS

Background of Present Disclosure

Figure 18:
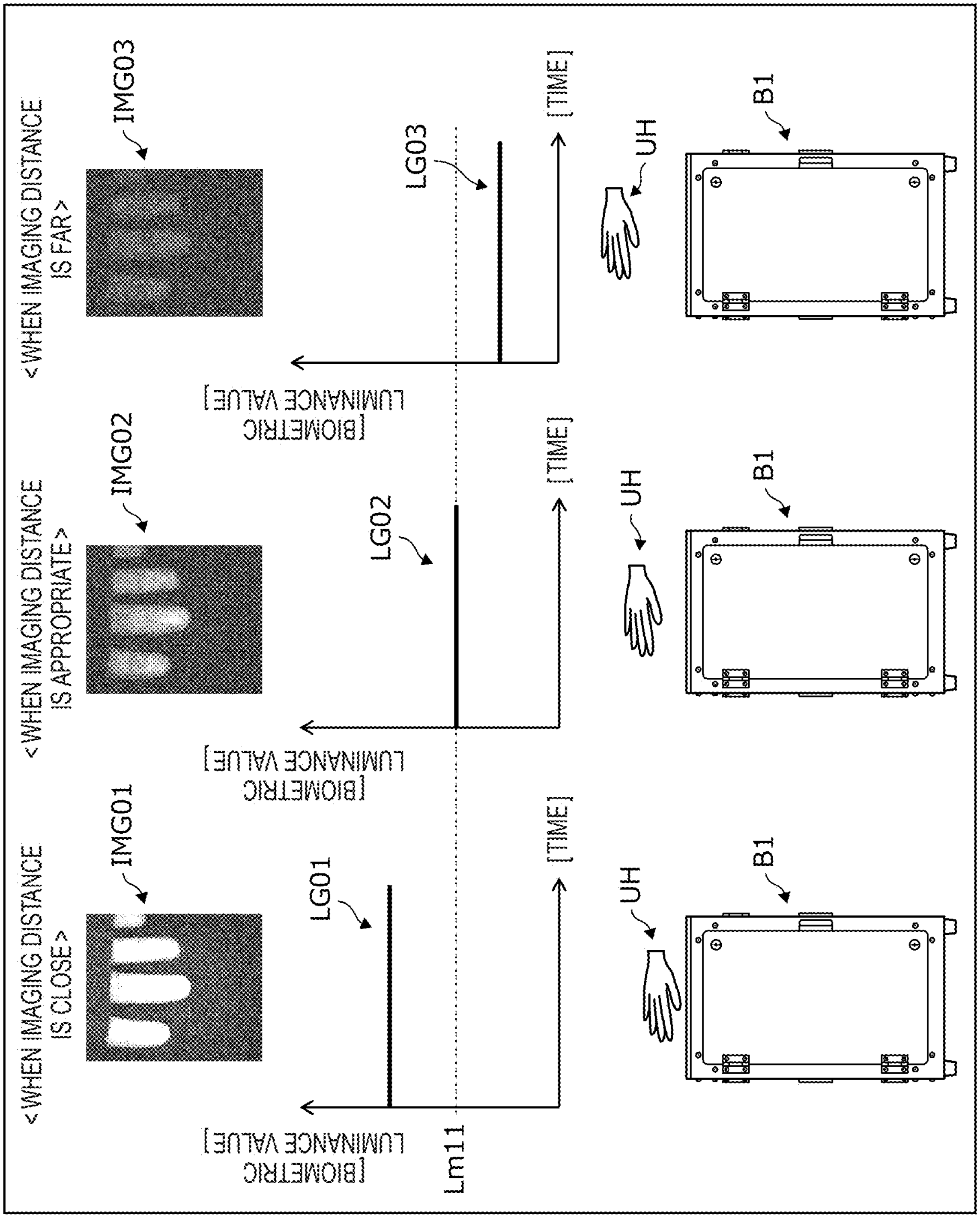
FIG. 18 is a diagram illustrating an example of an exposure control in a related authentication device.

As a comparative example of each embodiment described later, an example of capturing an image in a case in which a related exposure control is executed will be described with reference to FIG. 18. FIG. 18 is a diagram illustrating an example of the exposure control in a related authentication device B1. The authentication device B1 illustrated in FIG. 18 has the same configuration as the authentication device B1 described later.

Figure 3:
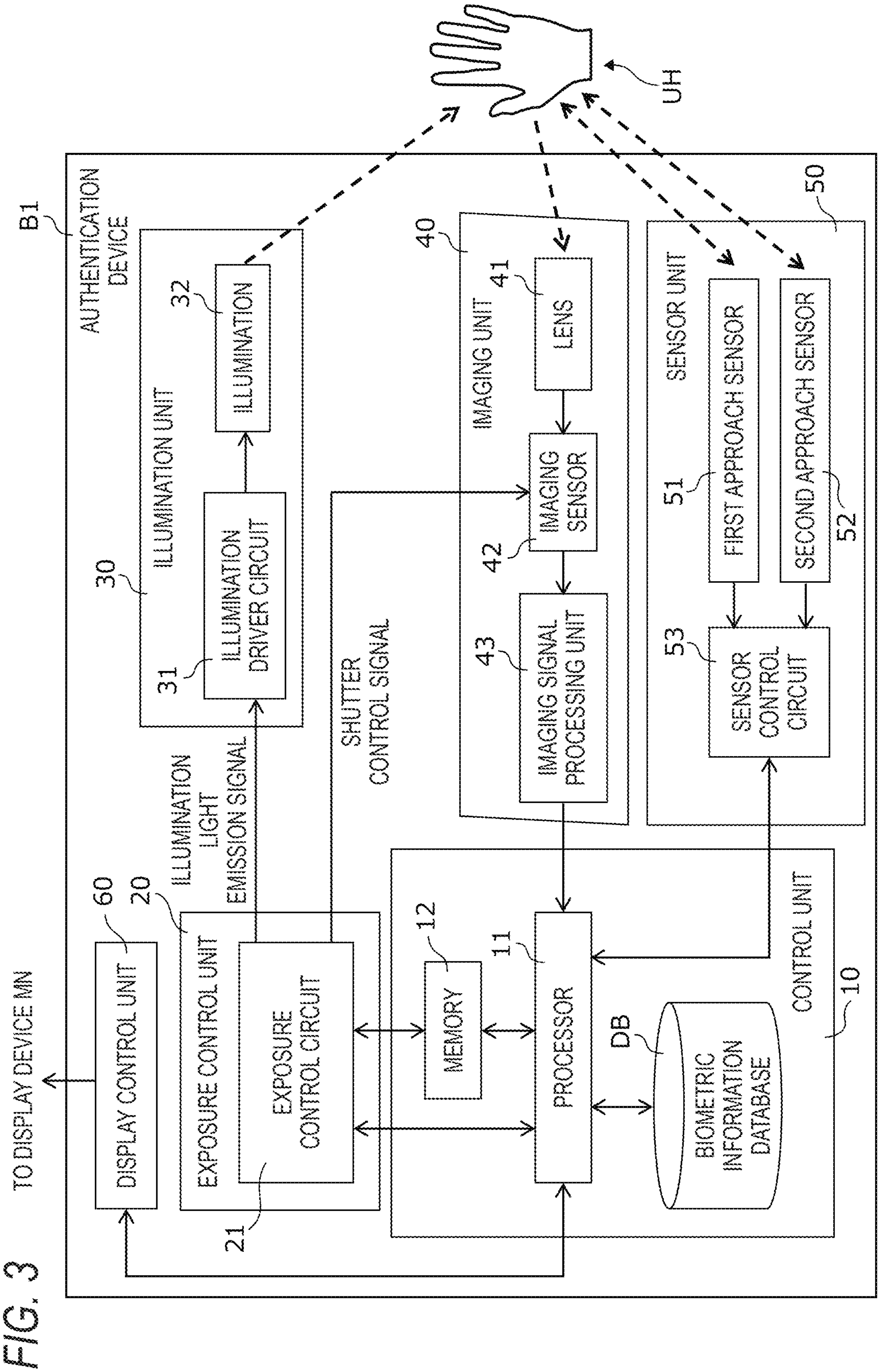
FIG. 3 is a block diagram illustrating an example of an internal configuration of the authentication device according to the first embodiment.

The authentication device B1 illuminates a hand UH of a user who is a biometric authentication target with an illumination unit 30 (see FIG. 3), and captures an image of the hand UH of the user with an imaging unit 40 (see FIG. 3). The authentication device B1 executes biometric authentication (user authentication) by using the captured image.

The authentication device B1 captures images of the moving hand UH of the user by controlling the illumination unit 30 and the imaging unit 40 under predetermined exposure conditions. Captured images IMG01, IMG02, and IMG03 are the captured images of the hand UH captured by the authentication device B1.

The captured image IMG01 is an image captured when a distance between the hand UH of the user and a glass surface 16 (see FIG. 3) of the authentication device B1 (hereinafter, referred to as an "imaging distance") is close. The hand UH of the user shown in the captured image IMG01 is overexposed due to the close imaging distance, resulting in deteriorated image quality. A luminance graph LG01 indicates a luminance value (hereinafter, referred to as a "biometric luminance value") of an area for extracting biometric information used for biometric authentication among an area of the hand UH of the user shown in the captured image IMG01. The biometric luminance value indicated by the luminance graph LG01 is larger than a biometric luminance value Lm11 suitable for acquiring (extracting) biometric information used for biometric authentication. Accordingly, the captured image IMG01 is a captured image that is not suitable for acquiring biometric information.

The captured image IMG02 is an image captured when the imaging distance is appropriate. A luminance graph LG02 indicates a biometric luminance value of the captured image IMG02. The biometric luminance value indicated by the luminance graph LG02 is substantially equal to the biometric luminance value Lm11 suitable for acquiring (extracting) biometric information used for biometric authentication. Accordingly, the captured image IMG02 is a captured image suitable for acquiring biometric information.

The captured image IMG03 is an image captured when the imaging distance is far. A luminance graph LG03 indicates a biometric luminance value of the captured image IMG03. The hand UH of the user shown in the captured image IMG03 is dark due to the far imaging distance, resulting in deteriorated image quality. The biometric luminance value indicated by the luminance graph LG03 is smaller than the biometric luminance value Lm11 suitable for acquiring (extracting) biometric information used for biometric authentication. Accordingly, the captured image IMG03 is a captured image that is not suitable for acquiring biometric information.

As described above, with the authentication device B1 that executes the related exposure control, it may be difficult to acquire biometric information suitable for biometric authentication or to achieve more accurate biometric authentication depending on a height at which the user holds the hand UH (that is, the imaging distance). In addition, it is necessary for the user to re-image many times in order to capture an image that enables acquisition of biometric information suitable for biometric authentication, which is time-consuming.

Accordingly, in the following embodiments, examples of a biometric authentication device, a biometric authentication method, and a biometric authentication system for capturing an image more suitable for biometric authentication will be described.

Hereinafter, embodiments in which configurations and operations of a biometric authentication device, a biometric authentication method, and a biometric authentication system according to the present disclosure are specifically disclosed will be described in detail with reference to the drawings as appropriate. However, unnecessarily detailed description may be omitted. For example, the detailed description of well-known matters and the redundant description of substantially the same configuration may be omitted. This is to avoid unnecessary redundancy of the following descriptions and to facilitate understanding of a person skilled in the art. The accompanying drawings and the following description are provided for a person skilled in the art to fully understand the present disclosure, and are not intended to limit the subject matters described in the claims.

First Embodiment

Figure 1:
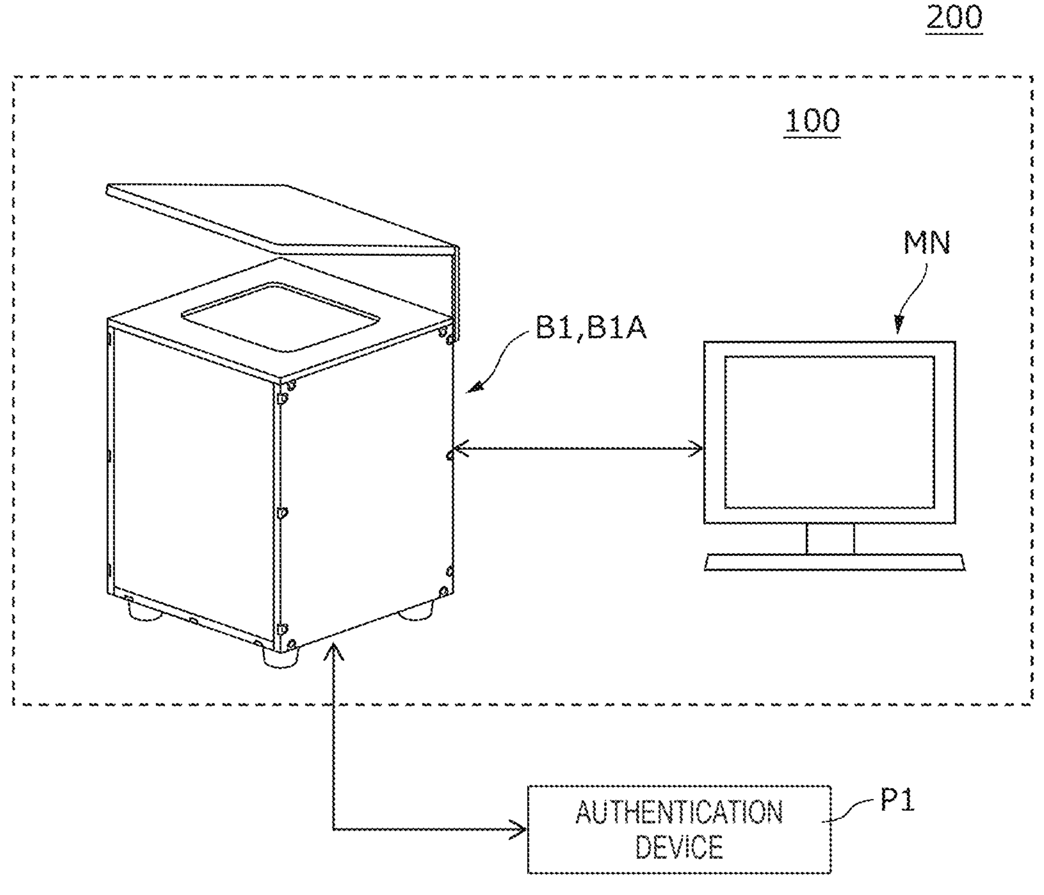
FIG. 1 is a diagram illustrating an example of a use case of a biometric authentication system according to a first embodiment and a biometric authentication system according to a modification of the first embodiment.

A use case of a biometric authentication system 100 according to a first embodiment will be described with reference to FIG. 1. FIG. 1 is a diagram illustrating an example of a use case of the biometric authentication systems 100 according to the first embodiment and a biometric authentication systems 200 according to a modification of the first embodiment. Here, the biometric authentication system 100 according to the first embodiment will be described, and the biometric authentication system 200 according to the modification of the first embodiment will be described later.

In the following description, biometric authentication using mainly fingerprints as biometric information will be described, but the biometric information is not limited thereto. The biometric information may be a fingerprint, a palm print, or a vein in a finger or palm of a user.

The biometric authentication system 100 according to the first embodiment includes the authentication device B1 and a monitor MN. The biometric authentication system 100 captures an image of at least a part (specifically, an area that enables extraction of biometric information used for biometric authentication) of the hand UH of the user who is a person to be authenticated by using the authentication device B1, and acquires biometric information of the user shown in the captured image. In addition, the biometric authentication system 100 executes biometric authentication by collating the biometric information of the user with each of a plurality of pieces of previously registered biometric information by using the authentication device B1, and outputs a biometric authentication result to the monitor MN and displays the biometric authentication result.

The monitor MN is implemented by using, for example, a liquid crystal display (LCD) or an organic electroluminescence (EL). The monitor MN displays a collation result output from the authentication device B1, or outputs sound by a speaker (not illustrated). The monitor MN may be implemented integrally with the authentication device B1.

The biometric authentication system 100 is described as an example in which the authentication device B1 and the monitor MN are implemented separately, whereas the authentication device B1 and the monitor MN may be integrally implemented.

Figure 2:
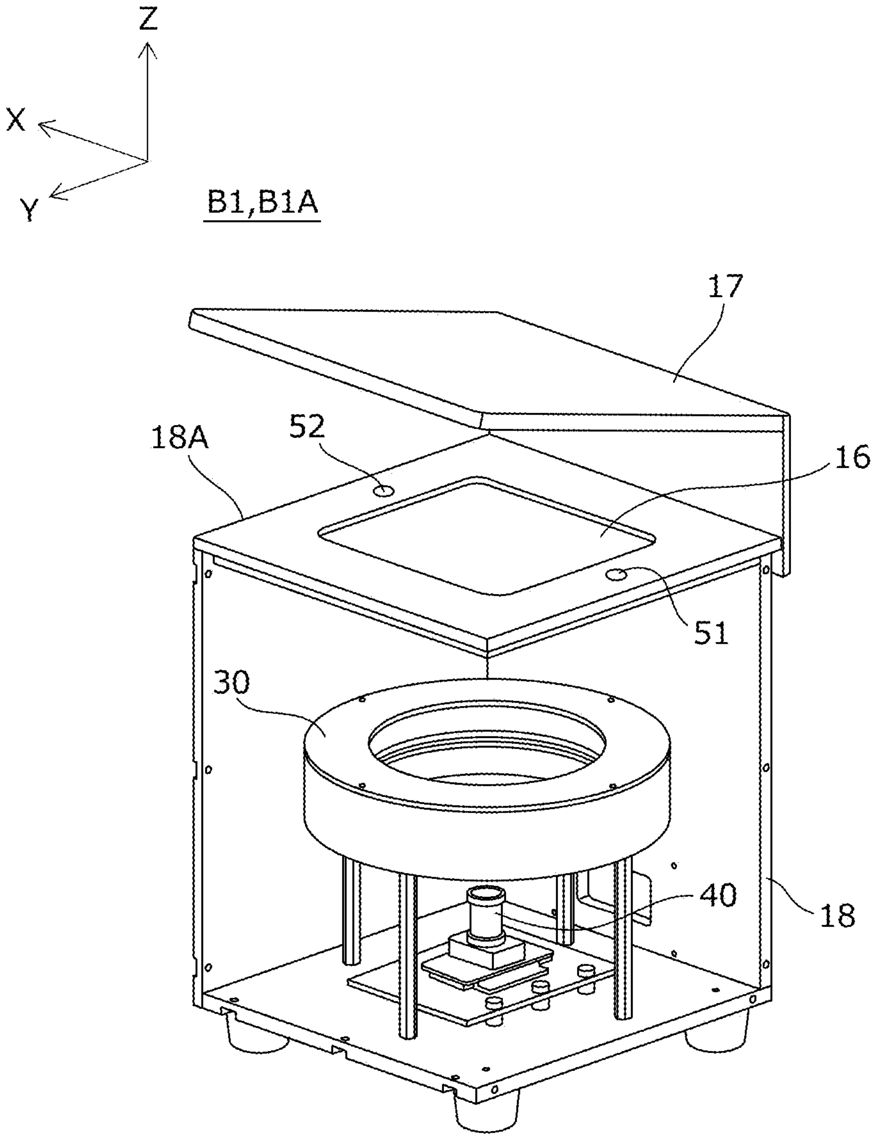
FIG. 2 is a perspective view of an interior of a housing of an authentication device according to the first embodiment and a biometric information acquiring device according to the modification of the first embodiment.

A structure and an internal configuration of the authentication device B1 will be described with reference to FIGS. 2 and 3, respectively. FIG. 2 is a perspective view of an interior of a housing 18 of the authentication device B1 according to the first embodiment and a biometric information acquiring device B1A according to the modification of the first embodiment. FIG. 3 is a block diagram illustrating an example of the internal configuration of the authentication device B1 according to the first embodiment.

The authentication device B1, which is an example of a biometric authentication device, is made of metal or resin. The authentication device B1 includes a control unit 10, a glass surface 16, a housing 18, an exposure control unit 20, the illumination unit 30, the imaging unit 40, a sensor unit 50, and a display control unit 60.

The control unit 10 includes a processor 11, a memory 12, and a biometric information database DB.

The processor 11, which is an example of an authentication unit, is implemented by using, for example, a central processing unit (hereinafter, referred to as a "CPU") or a system-on-a-chip (SOC), and performs various kinds of processing and control in cooperation with the memory 12. Specifically, the processor 11 implements functions of the control unit 10, the exposure control unit 20, the sensor unit 50, the display control unit 60, and the like by referring to a program and data stored in the memory 12 and executing the program.

The processor 11 causes the exposure control unit 20 to start control of the illumination unit 30 and the imaging unit 40 based on a first detection signal notifying of detection of the hand UH of the user output from the sensor unit 50.

The processor 11 causes the exposure control unit 20 to end the control of the illumination unit 30 and the imaging unit 40 based on a second detection signal notifying of detection of the hand UH of the user output from the sensor unit 50.

The processor 11 executes image processing on a captured image captured by the imaging unit 40) and extracts feature data of the biometric information of the user. The processor 11 executes user authentication (that is, biometric authentication) based on the extracted feature data of the biometric information of the user and feature data of biometric information of each of a plurality of users previously registered (stored) in the biometric information database DB. The processor 11 outputs the biometric authentication result to the display control unit 60 and causes the monitor MN to display the biometric authentication result.

The memory 12 includes, for example, a random access memory (hereinafter, referred to as a "RAM") as a work memory used when each processing of the processor 11 and an exposure control circuit 21 is executed, and a read only memory (hereinafter, referred to as a "ROM") storing a program and data defining operations of the processor 11 and the exposure control circuit 21. The RAM temporarily stores data or information generated or acquired by the processor 11 or the exposure control circuit 21. The program that defines the operations of the processor 11 and the exposure control circuit 21 is written into the ROM.

The memory 12 stores information related to an exposure control of the illumination unit 30 and the imaging unit 40 to be executed by the exposure control unit 20. The information related to the exposure control includes, for example, an exposure control pattern, an exposure condition, or an output pattern of a trigger signal. The exposure condition referred to here includes control parameters for executing the exposure control of the illumination unit 30 or the imaging unit 40, such as a shutter speed condition and an illumination condition.

The biometric information database DB is a storage medium device such as a hard disk drive (hereinafter, referred to as an "HDD") or a solid state drive (hereinafter, referred to as an "SSD"), and stores biometric information of a plurality of users previously registered by an administrator. The biometric information stored in the biometric information database DB is biometric information that enables biometric authentication such as a fingerprint or a vein of each of a plurality of fingers of the user, or a palm print of the user, and is stored in association with user information (for example, a name, a birthdate, an identification number that enables user identification, an employee number, or a face photograph).

Although the biometric information database DB illustrated in FIG. 3 is illustrated as an example integrally implemented with the authentication device B1, the biometric information database DB may be configured as an external storage device that is implemented separately from the authentication device B1 and is connected to the authentication device B1 in a manner of being capable of transmitting and receiving data via wireless communication or wired communication. The wireless communication referred to here is communication via a wireless local area network (LAN) such as Wi-Fi (registered trademark).

The glass surface 16 is disposed adjacent to at least one sensor (a first approach sensor 51 or a second approach sensor 52) on an upper surface of the housing 18. The glass surface 16 is provided such that the illumination unit 30 can illuminate the hand UH of the user passing over a housing upper surface 18A of the housing 18, and an image can be captured by the imaging unit 40.

A cover guide 17 is formed in a substantially L-shape with a metal or a resin as a material. One end of the substantially L-shaped cover guide 17 is fixed to one side of the housing upper surface 18A which is formed into a rectangular shape. The other end of the substantially L-shaped cover guide 17 is provided so as to cover the housing upper surface 18A, and shields illumination light of the illumination unit 30 passing through the glass surface 16 of the housing upper surface 18A on the other end side.

The other end side of the cover guide 17 is formed such that a distance (that is, a height) between the housing upper surface 18A and a lower surface of the cover guide 17 increases (is higher) from the side, among the four sides of the housing upper surface 18A, to which the one end of the cover guide 17 is fixed, toward an opposite side. This allows the authentication device B1 to increase the distance (that is, the height) between the cover guide 17 and the housing upper surface 18A in a direction in which the user is positioned. Accordingly, the distance (the height) between the cover guide 17 and the housing upper surface 18A is the highest toward the side where the user is positioned, and thus the user can easily insert and pass the hand between the cover guide 17 and the housing upper surface 18A.

The cover guide 17 opens between two sides adjacent to the side to which one end of the cover guide 17 is fixed (that is, a side corresponding to a direction in which the finger of the user enters and a side corresponding to a direction in which the finger moves away) and the other end side of the cover guide 17. This allows the user to intuitively grasp a direction in which the user passes the finger (that is, either a passing direction X or a direction opposite to the passing direction X).

The authentication device B1 can also limit, by the cover guide 17, a height of the hand UH of the user, that is, the imaging distance between the imaging unit 40 and the hand UH of the user to a distance between the cover guide 17 and the glass surface 16. The cover guide 17 is not an essential component in the authentication device B1 according to the first embodiment and may be omitted.

The exposure control unit 20, which is an example of a control unit, is implemented by using, for example, a CPU or an FPGA, and performs various kinds of processing and control in cooperation with the memory 12. Specifically, the exposure control unit 20 implements functions of the exposure control circuit 21 by referring to the program and data stored in the memory 12 and executing the program.

In response to acquiring a control command corresponding to the first detection signal output from the processor 11, the exposure control unit 20 executes control (the exposure control) of each of the illumination unit 30 and the imaging unit 40 based on information related to the exposure control stored in the memory 12. The exposure control referred to here is control for adjusting light amount taken in when the imaging unit 40 captures an image of the hand UH of the user. The exposure control unit 20 executes the exposure control such as ON/OFF control of an illumination 32 and start (ON) and end (OFF) control of a shutter of an imaging sensor 42.

The exposure control circuit 21 generates an illumination light emission signal for controlling the illumination 32 or a shutter control signal for controlling the imaging sensor 42 based on the information related to the exposure control. The exposure control circuit 21 outputs the generated illumination light emission signal to an illumination driver circuit 31. The exposure control circuit 21 outputs the generated shutter control signal to the imaging sensor 42.

The exposure control circuit 21 repeatedly executes the exposure control of each of the illumination unit 30 and the imaging unit 40 from a timing at which a control command corresponding to the first detection signal is acquired to a timing at which a control command corresponding to the second detection signal is acquired, and counts the number of execution times of the exposure control corresponding to each exposure condition. In response to acquiring the control command corresponding to the first detection signal output from the processor 11, the exposure control circuit 21 ends the exposure control of each of the illumination unit 30 and the imaging unit 40.

The illumination unit 30 is stored inside the housing 18 of the authentication device B1, and illuminates the hand UH of the user, which is an imaging target of the imaging unit 40. The illumination unit 30 includes the illumination driver circuit 31 and the illumination 32.

The illumination driver circuit 31 executes the ON/OFF control of the illumination 32 based on the control command output from the exposure control circuit 21.

The illumination 32 includes one or more illuminations such as a light emitting diode (LED), a laser diode (LD), and an infrared (IR) illumination. In FIG. 2, the illumination unit 30 formed in an annular shape is illustrated as an example, but the present disclosure is not limited thereto. For example, the illumination unit 30 may be a point light source, or may be configured such that a plurality of illuminations are disposed to have a polygonal shape or a substantially annular shape.

The imaging unit 40, which is an example of a camera, is stored inside the housing 18 of the authentication device B1, and captures an image of the hand UH of the user passing over the glass surface 16. The imaging unit 40 includes a lens 41, the imaging sensor 42, and an imaging signal processing unit 43.

The lens 41 forms an image of light incident on a lens barrel (not illustrated) on the imaging sensor 42.

The imaging sensor 42 is a so-called image sensor, and is, for example, a solid-state imaging element such as a charged-coupled device (CCD) or a complementary metal oxide semiconductor (CMOS). The imaging sensor 42 executes start/end control of an electronic shutter (not illustrated) (that is, start/end control of exposure) based on the shutter control signal output from the exposure control circuit 21. In addition, the imaging sensor 42 converts an optical image formed on an imaging surface by the lens 41 into an electrical signal at a frame rate previously set by an administrator, and outputs the electrical signal to the imaging signal processing unit 43.

The imaging signal processing unit 43 performs signal processing on the electrical signal output from the imaging sensor 42 and outputs the processed signal to the processor 11.

The sensor unit 50 includes the first approach sensor 51, the second approach sensor 52, and a sensor control circuit 53.

Each of the first approach sensor 51 (an example of a first sensor) and the second approach sensor 52 (an example of a second sensor) is specifically implemented by a reflective time of flight (TOF) sensor, an infrared sensor, or a transmissive laser sensor, a light receiving sensor, or the like. Each of the first approach sensor 51 and the second approach sensor 52 is disposed on the passing direction X in which the finger of the user passes across the glass surface 16, and detects the hand UH of the user passing through a predetermined detection area of each of the first approach sensor 51 and the second approach sensor 52. In response to detecting the hand UH of the user, each of the first approach sensor 51 and the second approach sensor 52 generates a detection signal and outputs the detection signal to the processor 11.

Figure 4:
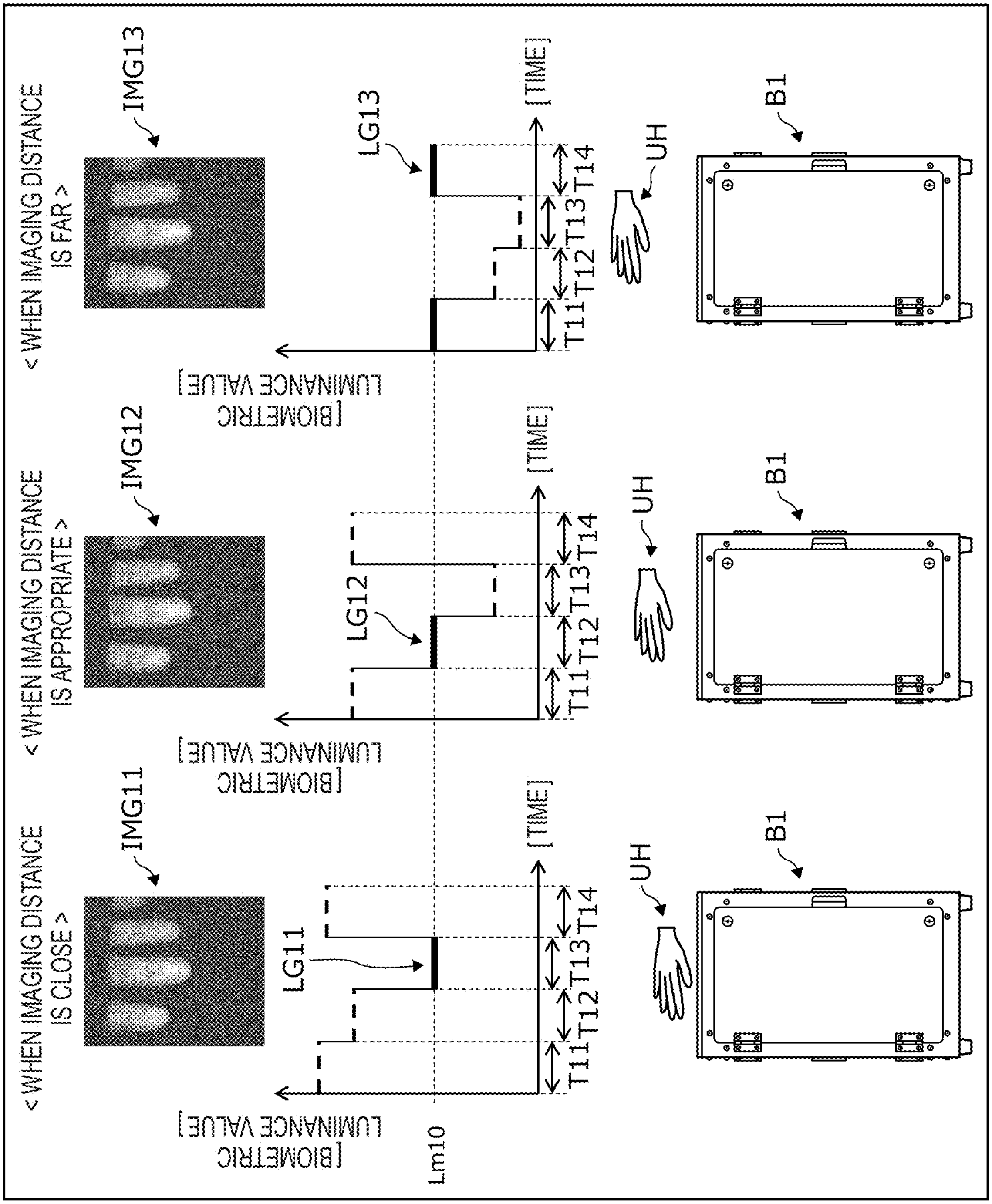
FIG. 4 is a diagram illustrating an example of an exposure control in the authentication device.

Next, the exposure control executed by the authentication device B1 will be described with reference to FIG. 4. FIG. 4 is a diagram illustrating an example of the exposure control in the authentication device B1. It is needless to say that the example of the exposure control illustrated in FIG. 4 is an example, and the present disclosure is not limited thereto.

Even when there is a variation in the imaging distance between the hand UH of the user and the imaging unit 40 (that is, the height of the hand UH of the user), the exposure control unit 20 executes the exposure control so that the biometric luminance value of the area for extracting the feature data of the biometric information of the hand UH of the user shown in the captured image is substantially equal to a biometric luminance value Lm10 suitable for extraction of the biometric information.

Specifically, the exposure control unit 20 executes, in a time division manner, an exposure control corresponding to each of a plurality of previously set exposure conditions stored in the memory 12, thereby realizing capturing an image suitable for extraction of biometric information of the user.

In the example illustrated in FIG. 4, the exposure control unit 20 switches exposure controls corresponding to three exposure conditions in a time division manner. For example, the exposure control unit 20 executes the exposure control corresponding to a first exposure condition in a time period T11, executes the exposure control corresponding to a second exposure condition in a time period T12, executes the exposure control corresponding to a third exposure condition in a time period T13, and executes the exposure control corresponding to the first exposure condition in a time period T14.

The first exposure condition illustrated in FIG. 4 is an exposure condition with the largest exposure (light amount). The second exposure condition is an exposure condition with exposure less than that of the first exposure condition and more than that of the third exposure condition. The third exposure condition is an exposure condition with the lowest exposure.

A luminance graph LG11 indicates a biometric luminance value of an area for extracting biometric information used for biometric authentication among an area of the hand UH of the user shown in each of the four captured images captured in the respective time periods T11 to T14 when the imaging distance between the imaging unit 40 and the hand UH of the user is close. In the luminance graph LG11, a biometric luminance value of a captured image IMG11 captured in the time period T13 under the third exposure condition is substantially equal to the biometric luminance value Lm10.

A luminance graph LG12 indicates biometric luminance values of four captured images captured in the respective time periods T11 to T14 when the imaging distance is appropriate. In the luminance graph LG12, a biometric luminance value of a captured image IMG12 captured in the time period T12 under the second exposure condition is substantially equal to the biometric luminance value Lm10.

A luminance graph LG13 indicates biometric luminance values of four captured images captured in the respective time periods T11 to T14 when the imaging distance is far. In the luminance graph LG13, biometric luminance values of captured images IMG13 captured in the time periods T11 and T14 under the first exposure condition are substantially equal to the biometric luminance value Lm10.

As described above, the authentication device B1 switches the plurality of exposure conditions in a time division manner and captures an image of the hand UH of the user under each exposure condition, thereby being able to capture an image suitable for extraction of biometric information even when there is variation in the height of the hand of the user (that is, the imaging distance).

The number of exposure conditions may be freely set based on a dynamic range of the imaging unit 40, a size of an imaging area that can be imaged by the imaging unit 40, a speed of the hand of the user passing over the glass surface 16, and the like. For example, in a case in which the dynamic range of the imaging unit 40 is small, the authentication device B1 increases the number of exposure conditions to facilitate acquisition of a captured image with a biometric luminance value closer to the biometric luminance value Lm10 suitable for extraction of biometric information.

In the authentication device B1, a length of a time period during which the exposure control corresponding to each exposure condition is executed may be set based on the number of exposure conditions, the speed of the hand of the user passing over the glass surface 16, and the like. For example, in the example illustrated in FIG. 4, the length of each of the time periods T11 to T14 is 70 frames per second (fps) to 80 frames per second (fps), but the present disclosure is not limited thereto. For example, when there are four or more exposure conditions, the authentication device B1 shortens the length of each of the time periods T11 to T14.

Figure 5:
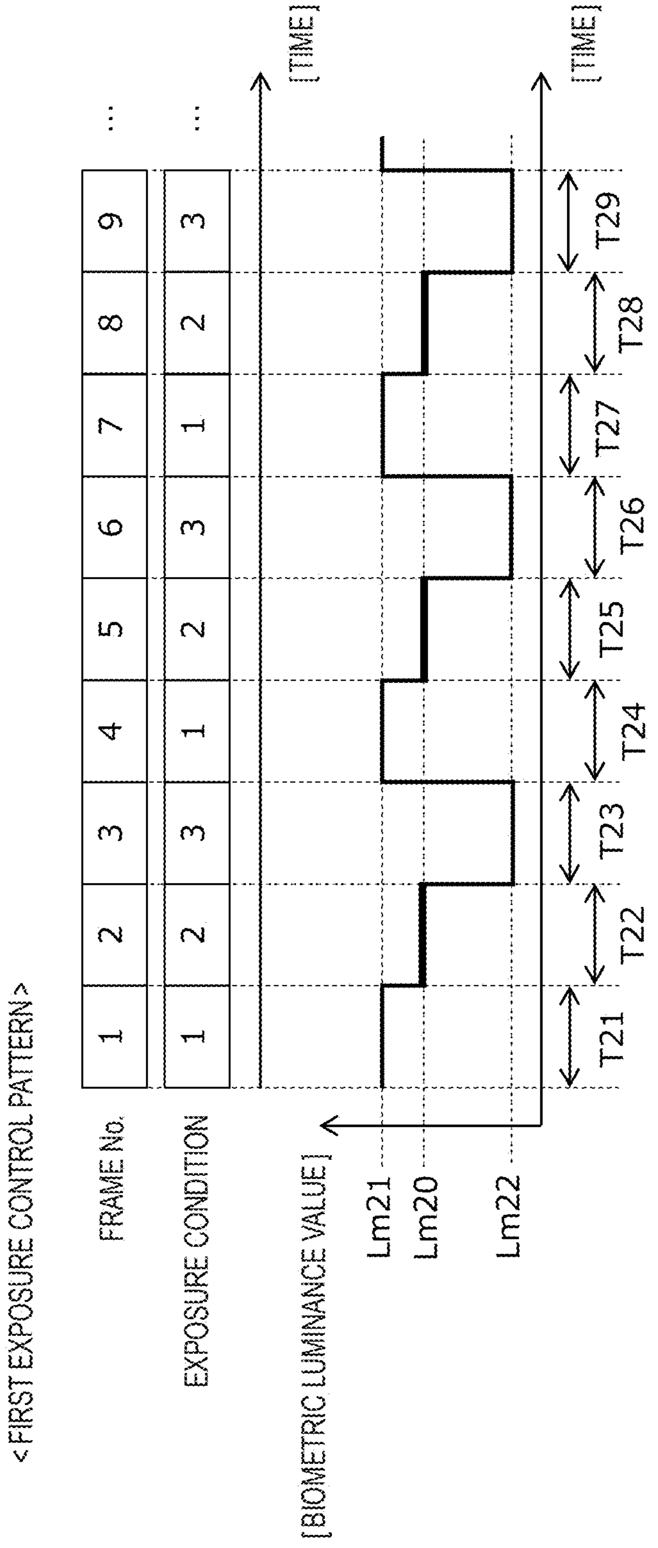
FIG. 5 is a diagram illustrating an example of a first exposure control pattern in the authentication device.
Figure 6:
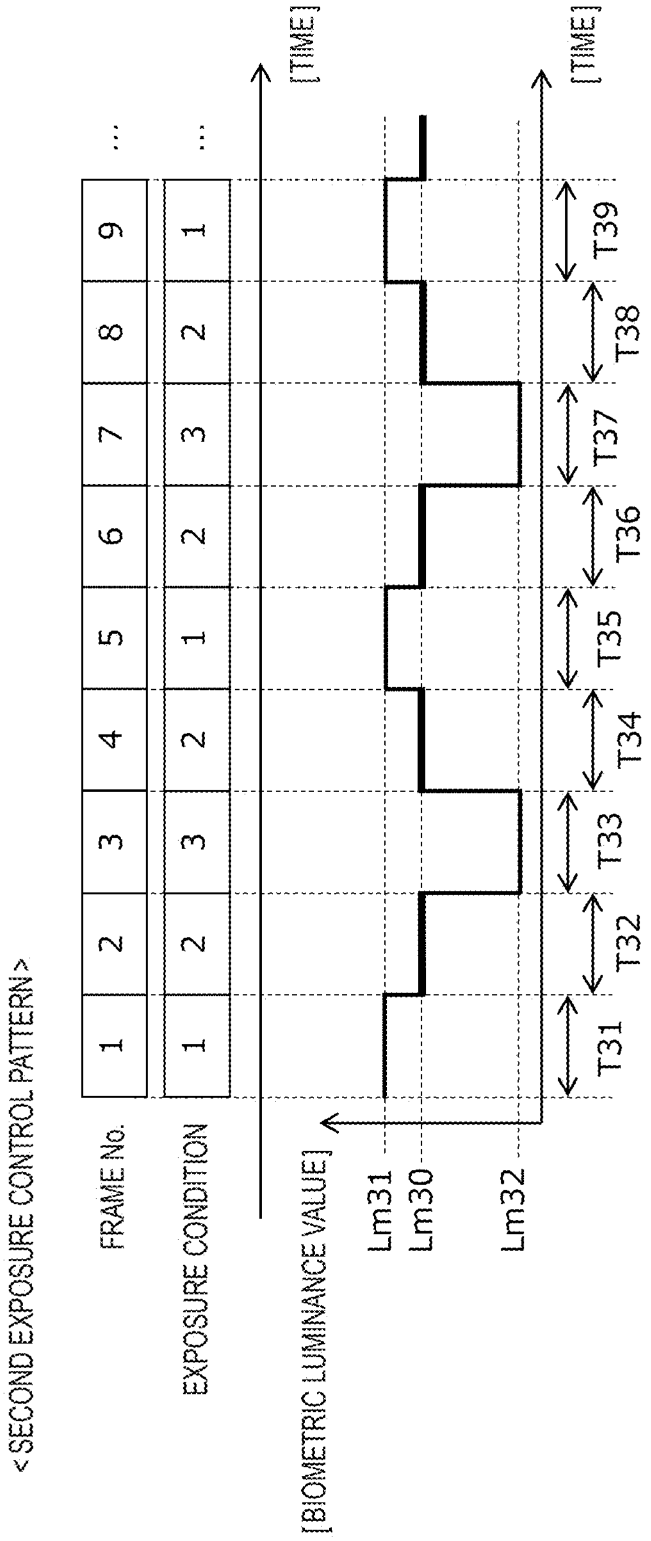
FIG. 6 is a diagram illustrating an example of a second exposure control pattern in the authentication device.

Next, a switching pattern (hereinafter, referred to as an "exposure control pattern") in which the exposure control corresponding to each exposure condition is switched in a time division manner will be described with reference to FIGS. 5 and 6. FIG. 5 is a diagram illustrating an example of a first exposure control pattern in the authentication device B1. FIG. 6 is a diagram illustrating an example of a second exposure control pattern in the authentication device.

In FIGS. 5 and 6, for ease of understanding, an exposure control pattern in which three exposure controls corresponding to three exposure conditions are switched will be described. FIGS. 5 and 6 each illustrate an example in which the authentication device B1 captures an image of the hand UH of the user held up at the same imaging distance (the same height).

The first exposure control pattern illustrated in FIG. 5 is a control pattern in which the exposure controls corresponding to the exposure conditions are switched in a time division manner in the order of "exposure condition 1"→"exposure condition 2"→"exposure condition 3". The first exposure control pattern is a control pattern in which three exposure controls corresponding to "exposure condition 1"→"exposure condition 2"→"exposure condition 3" are set as one period.

The exposure control unit 20 repeatedly executes the exposure controls based on the first exposure control pattern from a timing at which a control command output from the processor 11 for starting the exposure control is acquired to a timing at which a control command for ending the exposure control is acquired.

Specifically, the exposure control unit 20 executes, in a time division manner, the exposure control corresponding to the "exposure condition 1" in a time period T21, the exposure control corresponding to the "exposure condition 2" in a time period T22, the exposure control corresponding to the "exposure condition 3" in a time period T23, the exposure control corresponding to the "exposure condition 1" in a time period T24, the exposure control corresponding to the "exposure condition 2" in a time period T25, the exposure control corresponding to the "exposure condition 3" in a time period T26, the exposure control corresponding to the "exposure condition 1" in a time period T27, the exposure control corresponding to the "exposure condition 2" in a time period T28, and the exposure control corresponding to the "exposure condition 3" in a time period T29.

Accordingly, the authentication device B1 can acquire, during each of the time periods T21, T24, and T27 in which the exposure control corresponding to the "exposure condition 1" is executed, captured images (frames No. "1", "4", and "7") in which the biometric luminance value of the hand UH of the user is a biometric luminance value Lm21.

The authentication device B1 can acquire, during each of the time periods T22, T25, and T28 in which the exposure control corresponding to the "exposure condition 2" is executed, captured images (frames No. "2", "5", and "8") in which the biometric luminance value of the hand UH of the user is a biometric luminance value Lm20.

The authentication device B1 can acquire, during each of the time periods T23, T26, and T29 in which the exposure control corresponding to the "exposure condition 3" is executed, captured images (frames No. "3", "6", and "9") in which the biometric luminance value of the hand UH of the user is a biometric luminance value Lm22.

As described above, the authentication device B1 can acquire three captured images having three different biometric luminance values (the biometric luminance values Lm20 to Lm22) during the time periods T21 to T23, T24 to T26, and T27 to T29. That is, the authentication device B1 can more efficiently capture images suitable for extraction of biometric information by periodically and repeatedly executing the three exposure controls corresponding to the three exposure conditions.

The second exposure control pattern illustrated in FIG. 6 is a control pattern in which the exposure controls corresponding to the exposure conditions are switched in a time division manner in the order of "exposure condition 1"→"exposure condition 2"→"exposure condition 3"→"exposure condition 2". The second exposure control pattern is a control pattern in which four exposure controls corresponding to "exposure condition 1"→"exposure condition 2"→"exposure condition 3"→"exposure condition 2" are set as one period.

The exposure control unit 20 repeatedly executes the exposure controls based on the second exposure control pattern from a timing at which a control command output from the processor 11 for starting the exposure control is acquired to a timing at which a control command for ending the exposure control is acquired.

Specifically, the exposure control unit 20 executes, in a time division manner, the exposure control corresponding to the "exposure condition 1" in a time period T31, the exposure control corresponding to the "exposure condition 2" in a time period T32, the exposure control corresponding to the "exposure condition 3" in a time period T33, the exposure control corresponding to the "exposure condition 2" in a time period T34, the exposure control corresponding to the "exposure condition 1" in a time period T35, the exposure control corresponding to the "exposure condition 2" in a time period T36, the exposure control corresponding to the "exposure condition 3" in a time period T37, the exposure control corresponding to the "exposure condition 2" in a time period T38, and the exposure control corresponding to the "exposure condition 1" in a time period T39.

Accordingly, the authentication device B1 can acquire, during each of the time periods T31, T35, and T39 in which the exposure control corresponding to the "exposure condition 1" is executed, captured images (frames No. "1", "5", and "9") in which the biometric luminance value of the hand UH of the user is a biometric luminance value Lm31.

The authentication device B1 can acquire, during each of the time periods T32, T34, T36, and T38 in which the exposure control corresponding to the "exposure condition 2" is executed, captured images (frames No. "2", "4", "6", and "8") in which the biometric luminance value of the hand UH of the user is a biometric luminance value Lm30.

The authentication device B1 can acquire, during each of the time periods T33 and T37 in which the exposure control corresponding to the exposure condition 3 is executed, captured images (frames No. "3" and "7") in which the biometric luminance value of the hand UH of the user is a biometric luminance value Lm32.

As described above, the authentication device B1 can acquire four captured images having three different biometric luminance values (the biometric luminance values Lm30 to Lm32) during the time periods T31 to T34 and T35 to T38. That is, the authentication device B1 can more efficiently capture images suitable for extraction of biometric information by periodically and repeatedly executing the four exposure controls corresponding to the three exposure conditions.

In addition, when the exposure control is executed in the second exposure control pattern, the exposure control unit 20 does not switch from the exposure control for obtaining the biometric luminance value Lm32, which is the smallest biometric luminance value, to the exposure control for obtaining the biometric luminance value Lm31, which is the largest biometric luminance value, and thus a change amount of control parameters (for example, a shutter speed, a light emission time of the illumination 32) when switching the exposure control can be reduced. Accordingly, the authentication device B1 can more effectively prevent a tracking delay of each part of the illumination unit 30 and the imaging unit 40 when switching the exposure control.

Figure 7:
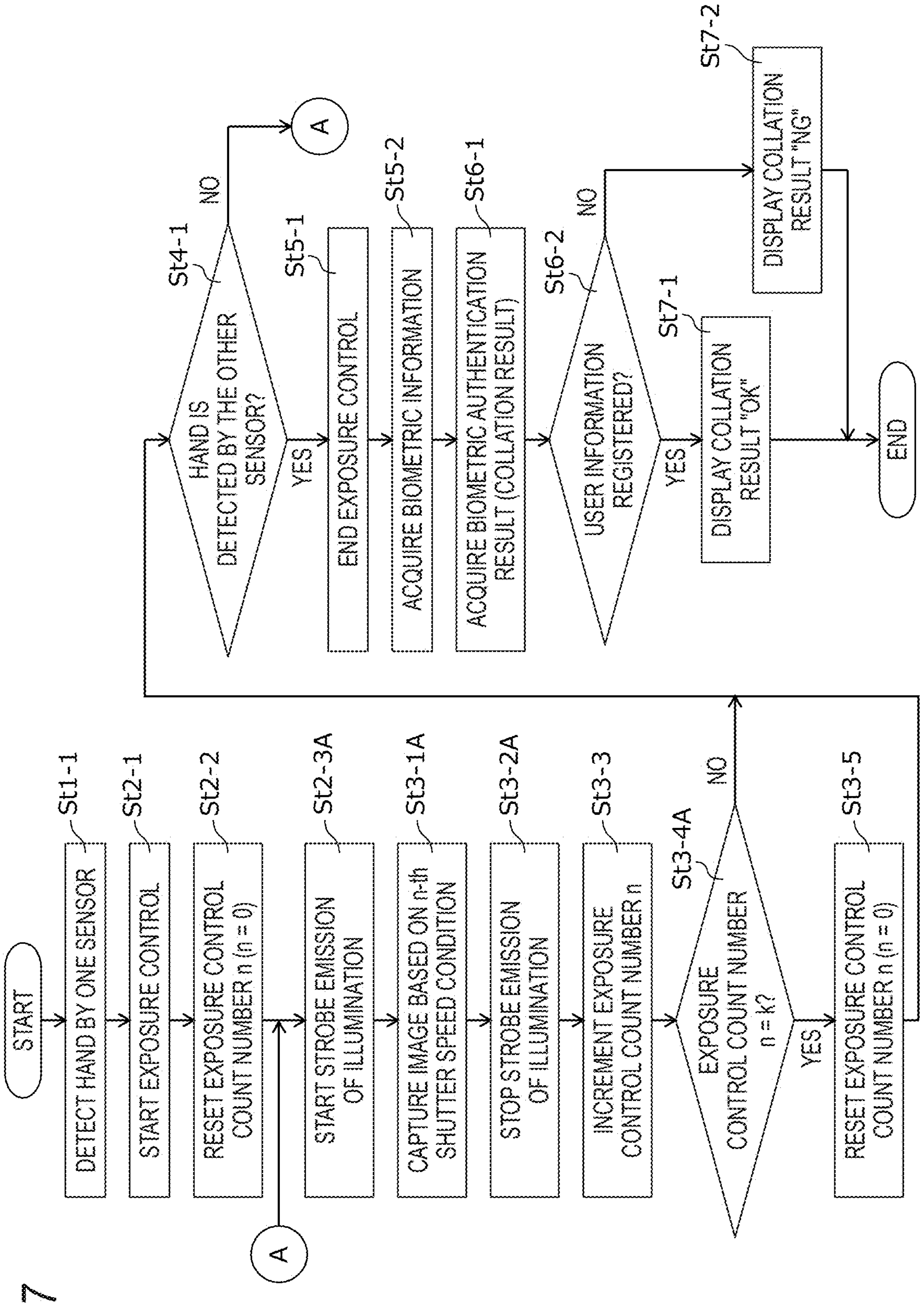
FIG. 7 is a flowchart illustrating a first operation procedure of the biometric authentication system according to the first embodiment.
Figure 8:
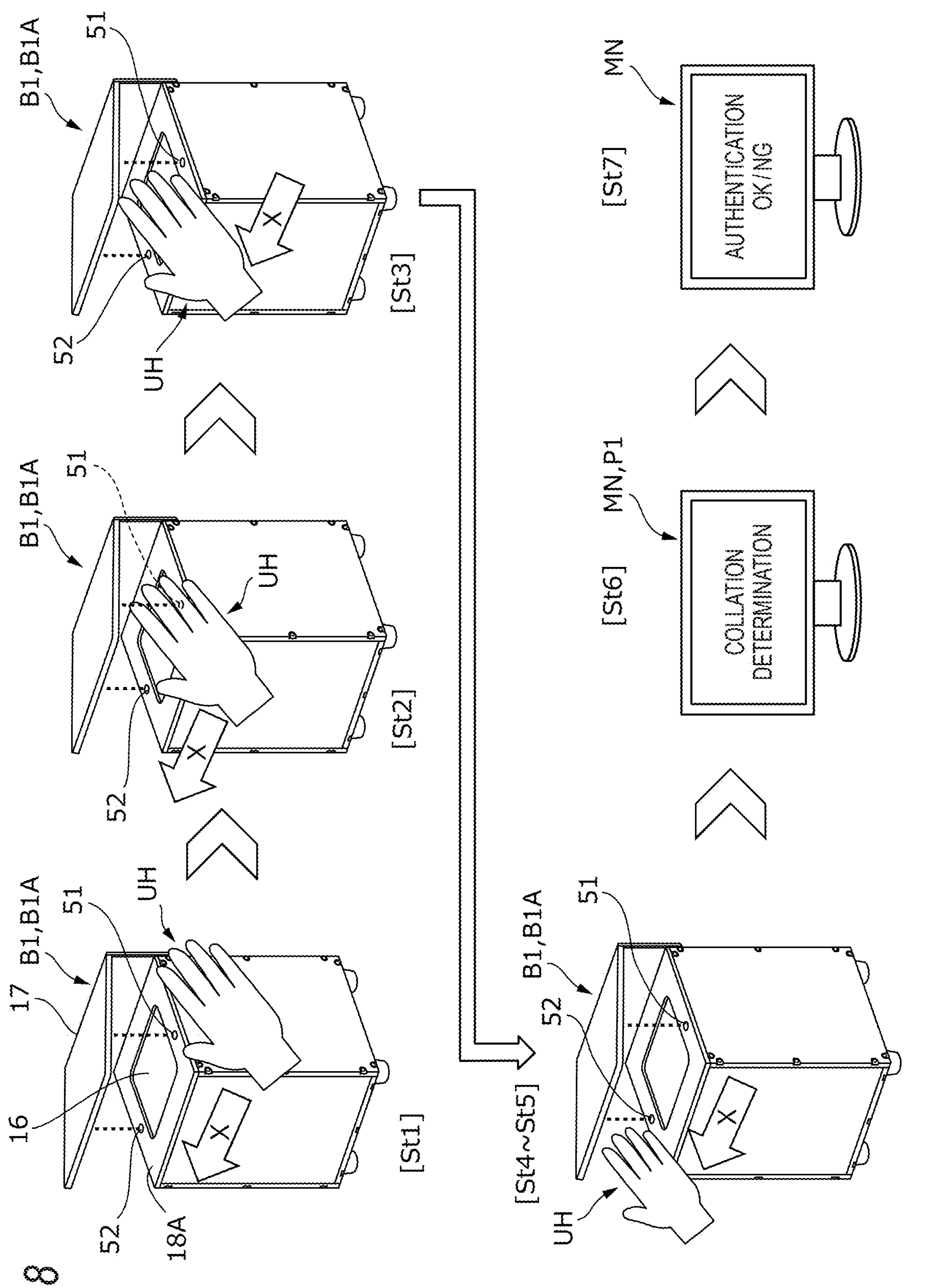
FIG. 8 is a diagram illustrating an example of use of the biometric authentication system.

Next, a first operation procedure of the biometric authentication system 100 according to the first embodiment will be described with reference to FIGS. 7 to 9. FIG. 7 is a flowchart illustrating the first operation procedure of the biometric authentication system 100 according to the first embodiment. FIG. 8 is a diagram illustrating an example of use of the biometric authentication system 100. FIG. 9 is a table TB1 illustrating an example of the shutter speed condition in the authentication device B1.

A correspondence relationship between each processing executed by the authentication device B1 and each processing executed by the monitor MN in the flowchart illustrated in FIG. 7 is illustrated in a table TB3 in FIG. 17, which will be described later.

For ease of understanding, an example will be described in which the authentication device B1 executes an exposure control pattern for one period, the exposure control pattern being for sequentially executing exposure control corresponding to each shutter speed condition (exposure condition) once each.

The first operation procedure is an operation procedure of the biometric authentication system 100 when exposure controls are executed under exposure conditions which are constant in an illumination light emission time of the illumination 32 and different in the shutter speed of the imaging unit 40. In the description of FIGS. 7 to 9, the term "exposure condition" is expressed as the term "shutter speed condition".

The authentication device B1 detects approach or insertion of the hand UH of the user between the cover guide 17 and the glass surface 16 by one of the sensors (the first approach sensor 51 or the second approach sensor 52) (St1-1).

The authentication device B1 starts the exposure control corresponding to each of a plurality of previously set exposure conditions from a timing at which one of the sensors (the first approach sensor 51 or the second approach sensor 52) detects the approach or insertion of the hand UH of the user (St2-1). The authentication device B1 resets an exposure control count number n (n is an integer equal to or larger than 0), which is a counted number of executed exposure controls, to n=0) (zero) (St2-2).

The authentication device B1 starts strobe emission of the illumination 32 based on the information related to the exposure control stored in the memory 12 (St2-3A).

The authentication device B1 captures an image of the hand UH of the user at a shutter speed based on an n-th shutter speed condition among the plurality of shutter speed conditions stored in the memory 12 (St3-1A).

For example, the authentication device B1 captures an image at a shutter speed of 20 μs which is a zeroth shutter speed condition when n=0, captures an image at a shutter speed of 25 μs which is a first shutter speed condition when n=1, captures an image at a shutter speed of 35 μs which is a second shutter speed condition when n=2, and captures an image at a shutter speed of 50 μs which is a third shutter speed condition when n=3. The authentication device B1 captures an image at a shutter speed of 150 μs which is a k-th shutter speed condition when n=k (k is an integer equal to or larger than 2). The values of the shutter speeds of the shutter speed conditions illustrated in FIG. 9 are merely examples, and the present disclosure is not limited thereto.

After the imaging processing is executed by the imaging unit 40, the authentication device B1 stops the strobe emission of the illumination 32 (St3-2A), and increments the exposure control count number n (n+1) (St3-3).

The authentication device B1 determines whether the incremented exposure control count number n is equal to the number k of the shutter speed condition (St3-4A).

In response to determining that the incremented exposure control count number n is equal to the number k of the shutter speed condition (n=k) in the processing of step St3-4A, (St3-4A, YES), the authentication device B1 resets the exposure control count number n (n=0 (zero)) (St3-5), and determines whether the hand UH of the user is detected by the other sensor (the first approach sensor 51 or the second approach sensor 52) (St4-1).

On the other hand, in response to determining that the incremented exposure control count number n is not equal to the number k of the shutter speed condition (n≠k) in the processing of step St3-4A (St3-4A, NO), the authentication device B1 determines whether the hand UH of the user is detected by the other sensor (St4-1).

In response to determining that the hand UH of the user is detected by the other sensor in the processing of step St4-1 (St4-1, YES), the authentication device B1 ends the exposure control (St5-1).

On the other hand, in response to determining that the hand UH of the user is not detected by the other sensor in the processing of step St4-1 (St4-1, NO), the authentication device B1 proceeds to the processing of step St2-3A.

The authentication device B1 selects, from at least one captured image for extracting biometric authentication from each of a plurality of captured images captured under the respective shutter speed conditions, a captured image having a biometric luminance value optimal for acquiring biometric information. A finger for which the selection processing of the captured image is executed may be at least one previously determined finger (for example, an index finger, a middle finger, a ring finger, and a little finger). In addition, in a case in which a site for extracting the biometric information is a palm, the palm is detected and a biometric luminance value of the palm is calculated, and a captured image of which the calculated biometric luminance value is optimal for acquiring biometric information is selected.

The authentication device B1 extracts (acquires) feature data of the biometric information (for example, a fingerprint, a vein, and a palm print) of the user from the selected captured image (St5-2). The feature data of the biometric information is extracted by using a known technique (for example, a minutia method or a frequency feature analysis method). The minutia method is a method for extracting feature data of a fingerprint or a palm print by detecting an end point or a branch point (a division) indicating a break of a cut line of the fingerprint or the palm print in ridge lines of the fingerprint or the palm print. The frequency feature analysis method is a method for extracting feature data of a fingerprint or a palm print from a waveform of a frequency converted into a frequency based on an edge, a bending point, and the like of an unevenness of a fingerprint. In addition, feature data of a vein is obtained by extracting a vein pattern of a finger of the user from a captured image of the finger of the user captured using near-infrared light, for example.

The authentication device B1 collates the extracted feature data of the biometric information of the user with feature data of the biometric information of each of the plurality of users previously registered in the biometric information database DB. The authentication device B1 determines whether the extracted feature data of the user matches or is similar to the feature data of each of the plurality of pieces of biometric information, and acquires a biometric authentication result (a collation result) (St6-1).

The authentication device B1 determines whether user information (for example, a name, a birthdate, an identification number that enables user identification, an employee number, or a face photograph) that is a biometric authentication target is registered in the biometric information database DB (St6-2).

In response to determining that the extracted feature data of the user matches or is similar to the feature data of each of the plurality of pieces of biometric information and the user information of the user who is the biometric authentication target is registered in the biometric information database DB in the processing of step St6-2, (St6-2, YES), the authentication device B1 generates an authentication result screen notifying that the biometric authentication result (the collation result) is "OK", and transmits the authentication result screen to the monitor MN. The monitor MN displays the authentication result screen (the authentication result "OK") transmitted from the authentication device B1 (St7-1).

On the other hand, in response to determining that the extracted feature data of the user does not match or is not similar to the feature data of each of the plurality of pieces of biometric information and the user information of the user who is the biometric authentication target is not registered in the biometric information database DB in the processing of step St6-2, (St6-2, NO), the authentication device B1 generates an authentication result screen notifying that the biometric authentication result (the collation result) is "NG", and transmits the authentication result screen to the monitor MN. The monitor MN displays the authentication result screen (the authentication result "NG") transmitted from the authentication device B1 (St7-2).

As described above, the biometric authentication system 100 executes the exposure control based on the plurality of previously set shutter speed conditions (exposure conditions), and captures images of the hand UH of the user. Accordingly, the authentication device B1 can acquire captured images with different exposures (light amounts) by changing the shutter speed. Accordingly, the authentication device B1 can more efficiently acquire captured images captured with a brightness (biometric luminance value) suitable for extraction of biometric information.

Figure 10:
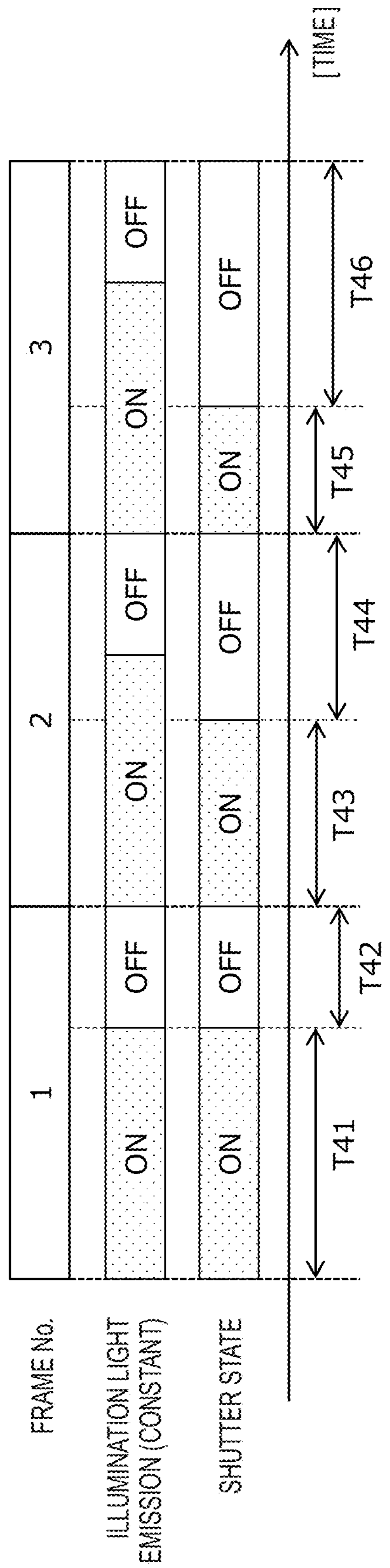
FIG. 10 is a timing chart illustrating an example of an exposure control of an illumination and an imaging sensor in a second operation procedure.

Next, an exposure control of the illumination unit 30 and the imaging unit 40 in a second operation procedure will be described with reference to FIG. 10. FIG. 10 is a timing chart illustrating an example of the exposure control of the illumination 32 and the imaging sensor 42 in the second operation procedure. It is needless to say that the example of the exposure control illustrated in FIG. 10 is an example, and the present disclosure is not limited thereto.

In the example illustrated in FIG. 10, the exposure control unit 20 switches exposure controls corresponding to three shutter speed conditions (exposure conditions) in a time division manner. The exposure control unit 20 executes the exposure control corresponding to a first shutter speed condition in time periods T41 and T42, the exposure control corresponding to a second shutter speed condition in time periods T43 and T44, and the exposure control corresponding to a third shutter speed condition in time periods T45 and T46.

For each of the three shutter speed conditions, the exposure control unit 20 repeatedly controls the illumination unit 30 to turn on the illumination 32 to emit light for a certain time period (the time period T41), and then to turn off the illumination 32 for a certain time period (the time period T42).

In addition, under the first shutter speed condition, the exposure control unit 20 controls the imaging unit 40 to bring the shutter into an open state during the time period T41 (that is, shutter speed=time period T41) and then bring the shutter into a closed state during the time period T42. Under the second shutter speed condition, the exposure control unit 20 controls the imaging unit 40 to bring the shutter into the open state during the time period T43 (that is, shutter speed=time period T43) and then bring the shutter into the closed state during the time period T44. Under the third shutter speed condition, the exposure control unit 20 controls the imaging unit 40 to bring the shutter into the open state during the time period T45 (that is, shutter speed=time period T45) and then bring the shutter into the closed state during the time period T46.

A magnitude relation of the time periods is T41>T43>T45. That is, in captured images captured under the three shutter speed conditions, the exposure (light amount) of the captured image (frame No. "1") captured under the first shutter speed condition is the largest, the exposure (light amount) of the captured image (frame No. "2") captured under the second shutter speed condition is smaller than that of the first shutter speed condition, and is larger than that of the third shutter speed condition, and the exposure (light amount) of the captured image (frame No. "3") captured under the third shutter speed condition is the smallest.

As described above, the authentication device B1 can acquire captured images with different exposures (light amounts) by capturing images while changing the time (shutter speed) of the shutter open state (exposed state) with respect to the light emission time of the illumination 32. Accordingly, the authentication device B1 can more efficiently acquire captured images captured with a brightness (biometric luminance value) suitable for extraction of biometric information.

Figure 11:
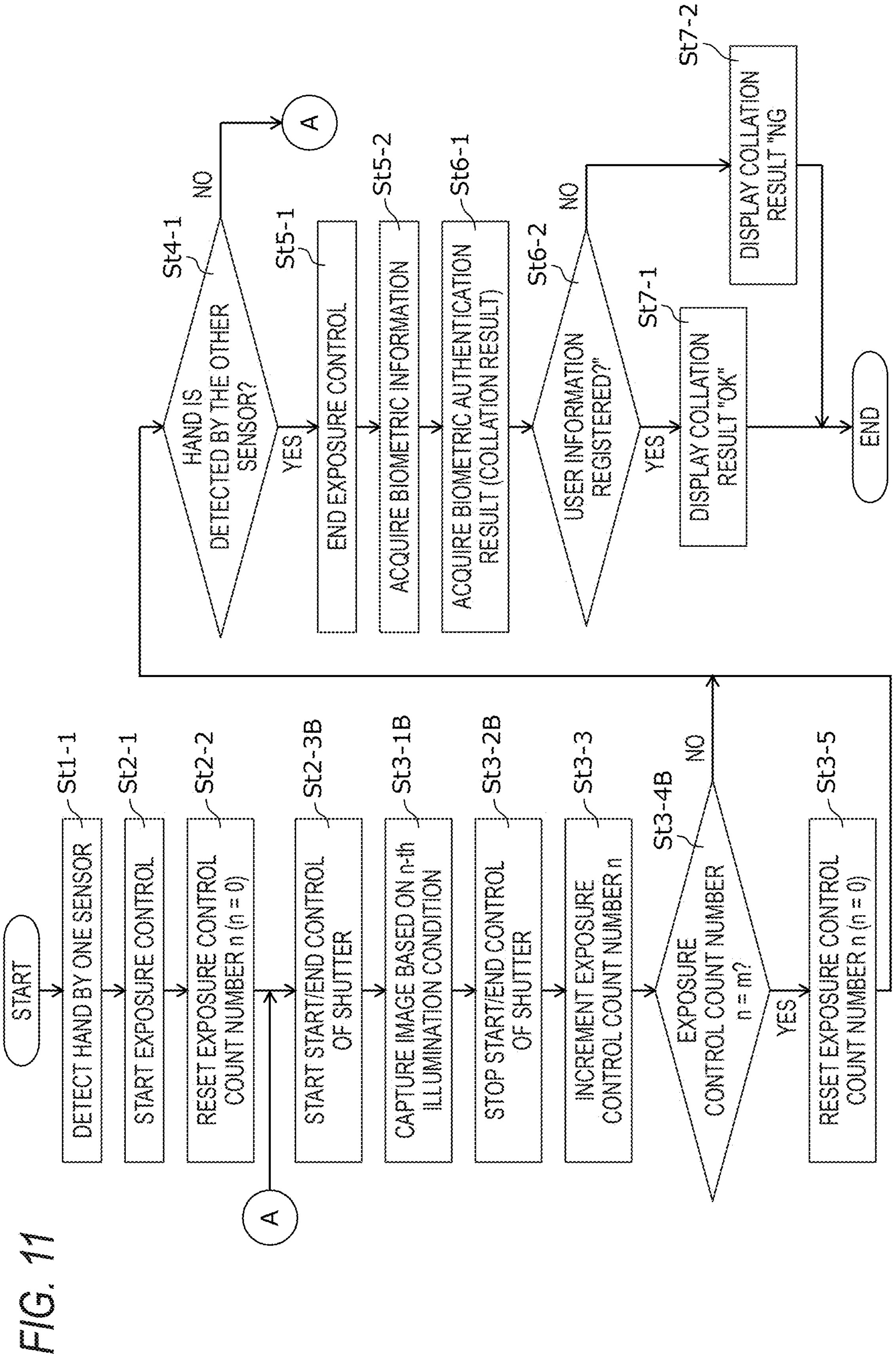
FIG. 11 is a flowchart illustrating the second operation procedure of the biometric authentication system according to the first embodiment.

Next, the second operation procedure of the biometric authentication system 100 according to the first embodiment will be described with reference to FIGS. 11 and 12. FIG. 11 is a flowchart illustrating the second operation procedure of the biometric authentication system 100 according to the first embodiment. FIG. 12 is a table TB2 illustrating an example of a second exposure condition (illumination condition) in the authentication device B1. In the second operation procedure of the biometric authentication system 100 illustrated in FIG. 11, the same processing as those in the first operation procedure of the biometric authentication system 100 illustrated in FIG. 7 is denoted by the same reference numerals, and the description thereof is omitted.

A correspondence between each processing executed by the authentication device B1 and each processing executed by the monitor MN in the flowchart illustrated in FIG. 11 is illustrated in a table TB3 in FIG. 17, which will be described later.

For ease of understanding, an example will be described in which the authentication device B1 executes an exposure control pattern for one period, the exposure control pattern being for sequentially executing exposure control corresponding to each illumination condition (exposure condition) once each.

The second operation procedure is an operation procedure of the biometric authentication system 100 when exposure controls are executed under exposure conditions which are constant in the shutter speed of the imaging unit 40 and different in the illumination light emission time of the illumination 32. In the description of FIGS. 11 and 12, the term "exposure condition" is expressed as the term "illumination condition".

The authentication device B1 starts the start/end control of the shutter of the imaging sensor 42 based on the information related to the exposure control stored in the memory 12 (St2-3B).

The authentication device B1 causes the illumination 32 to emit light during the illumination light emission time based on an n-th illumination condition among the plurality of illumination conditions stored in the memory 12, and captures an image of the hand UH of the user (St3-1B).

For example, the authentication device B1 captures an image with the illumination 32 turned on for an illumination light emission time of 20 μs which is a zeroth illumination condition when n=0), captures an image with the illumination 32 turned on for an illumination light emission time of 25 μs which is a first illumination condition when n=1, captures an image with the illumination 32 turned on for an illumination light emission time of 35 μs which is a second illumination condition when n=2, and captures an image with the illumination 32 turned on for an illumination light emission time of 50 μs which is a third illumination condition when n=3. The authentication device B1 captures an image with the illumination 32 turned on for an illumination light emission time of 150 μs which is an m-th illumination condition when n=m (m is an integer equal to or larger than 2).

After the imaging processing is executed by the imaging unit 40, the authentication device B1 stops the start/end control of the shutter of the imaging sensor 42 (St3-2B), and increments the exposure control count number n (n+1) (St3-3).

The authentication device B1 determines whether the incremented exposure control count number n is equal to the number n of the illumination speed condition (St3-4B).

In response to determining that the incremented exposure control count number n is equal to the number m of the illumination condition (n=m) in the processing of step St3-4B, (St3-4B, YES), the authentication device B1 resets the exposure control count number n (n=0) (St3-5), and determines whether the hand UH of the user is detected by the other sensor (the first approach sensor 51 or the second approach sensor 52) (St4-1).

On the other hand, in response to determining that the incremented exposure control count number n is not equal to the number m of the illumination condition (n≠m) in the processing of step St3-4B (St3-4B, NO), the authentication device B1 determines whether the hand UH of the user is detected by the other sensor (St4-1).

As described above, the biometric authentication system 100 executes the exposure control based on the plurality of previously set illumination conditions (exposure conditions), and captures images of the hand UH of the user. Accordingly, the authentication device B1 can acquire captured images with different exposures (light amounts) by changing the illumination light emission time of the illumination 32. Accordingly, the authentication device B1 can more efficiently acquire captured images captured with a brightness (biometric luminance value) suitable for extraction of biometric information.

Figure 13:
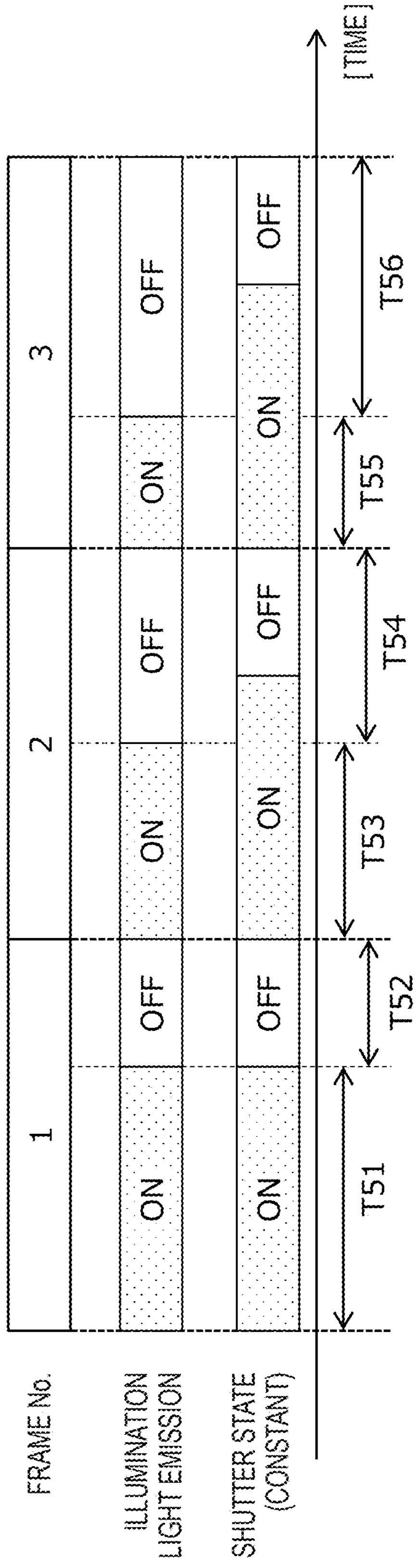
FIG. 13 is a timing chart illustrating an example of the exposure control of the illumination and the imaging sensor in the second operation procedure.

Next, the exposure control of the illumination unit 30 and the imaging unit 40 in the second operation procedure will be described with reference to FIG. 13. FIG. 13 is a timing chart illustrating an example of the exposure control of the illumination 32 and the imaging sensor 42 in the second operation procedure. It is needless to say that the example of the exposure control illustrated in FIG. 13 is an example, and the present disclosure is not limited thereto.

In the example illustrated in FIG. 13, the exposure control unit 20 switches exposure controls corresponding to three illumination conditions (exposure conditions) in a time division manner. The exposure control unit 20 executes the exposure control corresponding to a first illumination condition in time periods T51 and T52, the exposure control corresponding to a second illumination condition in time periods T53 and T54, and the exposure control corresponding to a third illumination condition in time periods T55 and T56.

For each of the three illumination conditions, the exposure control unit 20 repeatedly controls the imaging unit 40 to bring the shutter into the open state (ON (exposed) state) for a certain time period (the time periods T51, T53, and T55), and then to bring the shutter into the closed state (OFF state) for a certain time period (the time periods T52, T54, and T56). The shutter speeds are constant and equal to the time periods T51, T53, and T55.

In addition, under the first illumination condition, the exposure control unit 20 controls the illumination unit 30 to bring the illumination 32 into an ON state during the time period T51 (that is, illumination light emission time=time period T51) and then bring the illumination 32 into an OFF state during the time period T52. Under the second illumination condition, the exposure control unit 20 controls the illumination unit 30 to bring the illumination 32 into the ON state during the time period T53 (that is, illumination light emission time=time period T53) and then bring the illumination 32 into the OFF state during the time period T54. Under the third illumination condition, the exposure control unit 20 controls the illumination unit 30 to bring the illumination 32 into the ON state during the time period T55 (that is, illumination light emission time=time period T55) and then bring the illumination 32 into the OFF state during the time period T56.

A magnitude relation of the time periods is T51>T53>T55. That is, in captured images captured under the three illumination conditions, the exposure (light amount) of the captured image (frame No. "1") captured under the first illumination condition is the largest, the exposure (light amount) of the captured image (frame No. "2") captured under the second illumination condition is smaller than that of the first illumination condition, and is larger than that of the third illumination condition, and the exposure (light amount) of the captured image (frame No. "3") captured under the third illumination condition is the smallest.

As described above, the authentication device B1 can acquire captured images with different exposures (light amounts) by capturing images while changing the illumination light emission time of the illumination 32 with respect to a predetermined shutter speed of the imaging sensor 42. Accordingly, the authentication device B1 can more efficiently acquire captured images captured with a brightness (biometric luminance value) suitable for extraction of biometric information.

Figure 14:
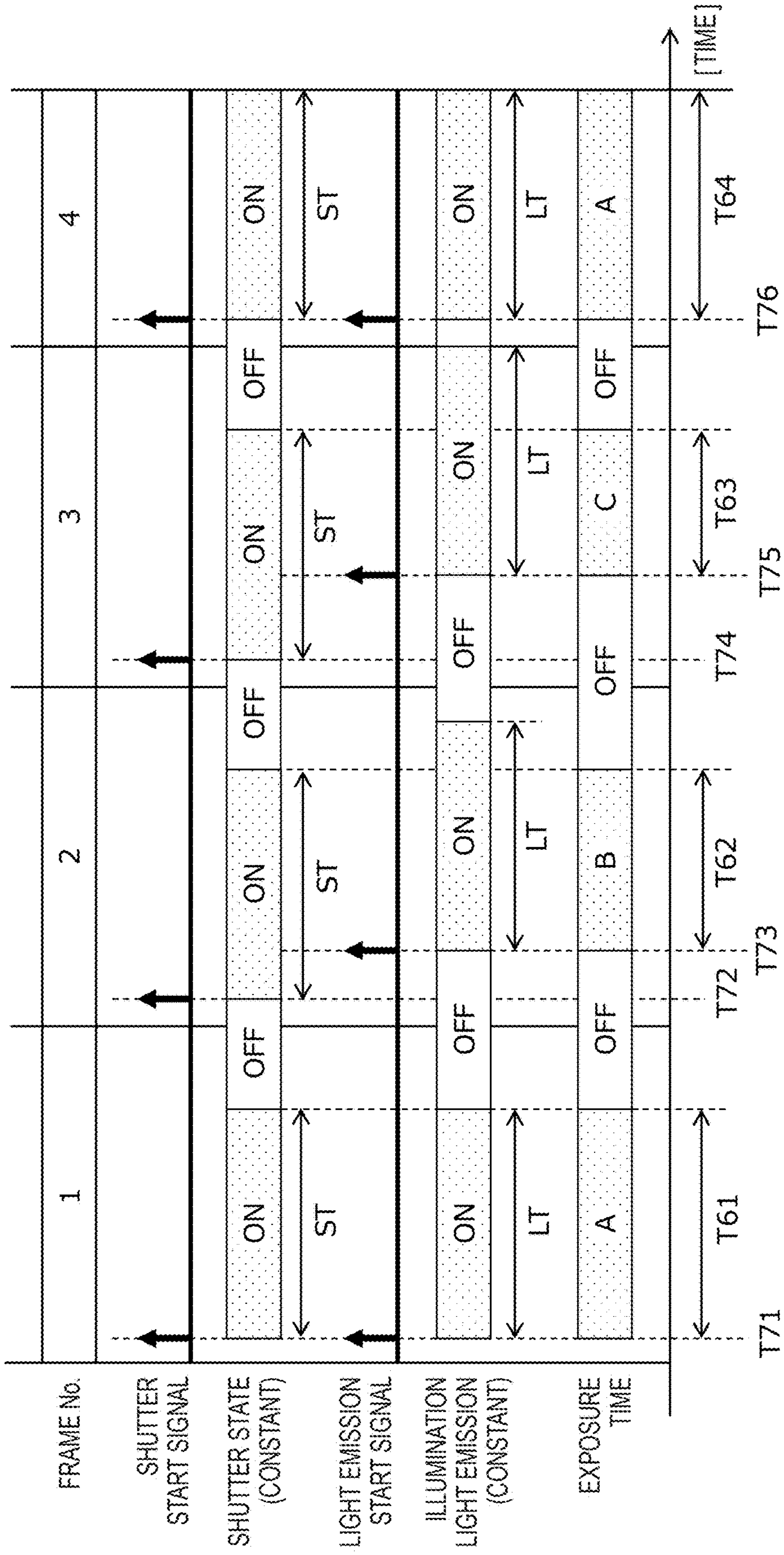
FIG. 14 is a timing chart illustrating an example of an exposure control of the illumination and the imaging sensor in the authentication device.

Next, an exposure control of the authentication device B1 will be described with reference to FIG. 14, the authentication device B1 including the illumination 32 (for example, a commercially available illumination) in which a timing of light emission start control can be controlled externally and a camera (for example, the commercially available imaging unit 40) in which a timing of shutter start control can be controlled externally. The illumination 32 that can be externally controlled executes light emission for a predetermined illumination light emission time set previously based on the light emission start control (for example, a trigger signal). The camera (imaging unit 40) that can be externally controlled executes imaging (start/end of the shutter) at a predetermined shutter speed set previously based on the shutter start control (for example, a trigger signal). FIG. 14 is a timing chart illustrating an example of the exposure control of the illumination 32 and the imaging sensor 42 in the authentication device B1. It is needless to say that the third exposure control processing illustrated in FIG. 14 is an example, and the present disclosure is not limited thereto.

In the example illustrated in FIG. 14, the exposure control unit 20 switches exposure controls corresponding to three exposure conditions in a time division manner. The exposure control unit 20 executes the exposure controls in an exposure control pattern in which the exposure controls corresponding to the exposure conditions are switched in a time division manner in the order of the first exposure condition→the second exposure condition→the third exposure condition.

The exposure control unit 20 repeatedly executes the exposure control of the illumination 32 and the imaging sensor 42 based on the above exposure control pattern from a timing at which the control command output from the processor 11 for starting the exposure control is acquired to a timing at which the control command for ending the exposure control is acquired.

The exposure control unit 20 controls the imaging sensor 42 at a constant shutter speed, and causes the illumination 32 to emit light for a constant illumination light emission time. The exposure control unit 20 adjusts the illumination light emission time of the illumination 32 with respect to the shutter speed (the shutter open state) of the imaging sensor 42 by respectively controlling a timing of outputting an illumination start signal (trigger signal) for turning on the illumination 32 to the illumination driver circuit 31, and a timing of outputting a shutter opening signal (trigger signal) to the imaging sensor 42 for bringing the shutter of the imaging sensor 42 into the open state (exposed state). Accordingly, the exposure control unit 20 can adjust the exposure (light amount) in capturing one image, and can capture images in which the biometric luminance values of the hand UH of the user shown in the captured images are different.

Under the first exposure condition, the exposure control unit 20 outputs the shutter opening signal and the light emission start signal at a timing of a time T71. The imaging sensor 42 brings the shutter into the open state (exposed state) based on the shutter opening signal output from the exposure control unit 20, and performs exposure at a shutter speed ST. The illumination 32 is turned on based on the light emission start signal output from the exposure control unit 20, and illuminates the hand UH of the user passing over the glass surface 16 during an illumination light emission time LT. The imaging unit 40 outputs a captured image (frame No. "1") to the processor 11.

Under the second exposure condition, the exposure control unit 20 outputs the shutter opening signal at a timing of a time T72 and outputs the light emission start signal at a timing of a time T73. The imaging sensor 42 brings the shutter into the open state (exposed state) based on the shutter opening signal output from the exposure control unit 20 at the time T72, and performs exposure at the shutter speed ST. The illumination 32 is turned on based on the light emission start signal output from the exposure control unit 20 at the time T73, and illuminates the hand UH of the user passing over the glass surface 16 during the illumination light emission time LT. The imaging unit 40 outputs a captured image (frame No. "2") to the processor 11.

Under the third exposure condition, the exposure control unit 20 outputs the shutter opening signal at a timing of a time T74 and outputs the light emission start signal at a timing of a time T75. The imaging sensor 42 brings the shutter into the open state (exposed state) based on the shutter opening signal output from the exposure control unit 20 at the time T74, and performs exposure at the shutter speed ST. The illumination 32 is turned on based on the light emission start signal output from the exposure control unit 20 at the time T75, and illuminates the hand UH of the user passing over the glass surface 16 during the illumination light emission time LT. The imaging unit 40 outputs a captured image (frame No. "3") to the processor 11.

After the exposure control corresponding to the third exposure condition is executed, the exposure control unit 20 executes the exposure control corresponding to the first exposure condition again. Under the first exposure condition, the exposure control unit 20 outputs the shutter opening signal and the light emission start signal at a timing of a time T76. The imaging sensor 42 brings the shutter into the open state (exposed state) based on the shutter opening signal output from the exposure control unit 20, and performs exposure at the shutter speed ST. The illumination 32 is turned on based on the light emission start signal output from the exposure control unit 20, and illuminates the hand UH of the user passing over the glass surface 16 during the illumination light emission time LT. The imaging unit 40 outputs a captured image (frame No. "4") to the processor 11.

Exposure times of the captured images (frames No. "1" and "4") captured under the first exposure condition are time periods T61 and T64 in which the shutter speed ST and the illumination light emission time LT overlap each other. The exposure (light amount) of the captured image (frame No. "1") is the largest as compared with other captured images.

An exposure time of the captured image (frame No. "2") captured under the second exposure condition is a time period T62 in which the shutter speed ST and the illumination light emission time LT overlap each other. The exposure (light amount) of the captured image (frame No. "2") is smaller than the exposures (light amounts) of the captured images (frame No. "1") captured under the first exposure condition, and is larger than the exposure (light amount) of the captured image (frame No. "3") captured under the third exposure condition.

An exposure time of the captured image (frame No. "3") captured under the third exposure condition is a time period T63 in which the shutter speed ST and the illumination light emission time LT overlap each other. The exposure (light amount) of the captured image (frame No. "3") is the smallest as compared with other captured images.

As described above, in a case in which the authentication device B1 captures an image of the hand UH of the user at a high speed, even when a processing load of the processor 11 or the exposure control unit 20 increases due to the simultaneous control of the ON/OFF control of the illumination 32 and the start/end control of the shutter of the imaging sensor 42, the authentication device B1 can realize the exposure control of each of the illumination 32 and the imaging sensor 42 only by executing generation and output of the respective trigger signals of the illumination 32 and the shutter of the imaging sensor 42.

Accordingly, even when there is a variation in the imaging distance of the hand UH of the user, the authentication device B1 can acquire a captured image captured at a brightness suitable for extraction of the biometric information.

In the first embodiment, an example is described in which the exposure control is executed based on the light emission control of the illumination 32 or the start/end control of the shutter of the imaging sensor 42, but the exposure control method is not limited thereto. The authentication device B1 may control the exposure (light amount) incident on the imaging sensor 42 by controlling an aperture of the lens 41. For example, in the example illustrated in FIG. 14, the exposure control unit 20 may execute the exposure control to adjust the aperture of the lens 41 during a period in which the shutter of the imaging sensor 42 is in the closed state (that is, an OFF period).

Modification of First Embodiment

The biometric authentication system 100 according to the first embodiment described above is described as an example in which the authentication device B1 captures an image of the hand UH of the user and executes the biometric authentication, and the monitor MN displays the biometric authentication result. The biometric authentication system 200 according to the modification of the first embodiment will be described with an example in which the biometric information acquiring device BIA captures an image of the hand UH of the user, an authentication device P1 executes biometric authentication, and the monitor MN displays a biometric authentication result. In the following description, the same components as those of the devices constituting the biometric authentication system 100 according to the first embodiment are denoted by the same reference numerals, and the description thereof is omitted.

Next, the biometric authentication system 200 according to the modification of the first embodiment will be described with reference to FIG. 1. The biometric authentication system 200 includes the biometric information acquiring device B1A, the authentication device P1, and the monitor MN.

The biometric authentication system 200 captures an image of the hand or a part of the hand UH of the user and acquires biometric information of the user shown in the captured image by the biometric information acquiring device B1A, and transmits the biometric information to the authentication device P1 connected to the biometric information acquiring device B1A in a manner of being capable of transmitting and receiving data therebetween. In addition, the biometric authentication system 200 executes biometric authentication by collating the biometric information of the user with each of a plurality of pieces of previously registered biometric information by the authentication device P1, and outputs a biometric authentication result to the biometric information acquiring device B1A. The biometric authentication system 200 generates an authentication result screen notifying of the biometric authentication result by the biometric information acquiring device B1A, and outputs the authentication result screen to the monitor MN for display.

The biometric authentication system 200 is described as an example in which the biometric information acquiring device B1A and the monitor MN are implemented separately, whereas the biometric information acquiring device B1A and the monitor MN may be integrally implemented.

In the biometric authentication system 200, the biometric information acquiring device B1A and the authentication device P1 may be connected to each other via a network (not illustrated) in a manner of being capable of transmitting and receiving data therebetween, or may be connected to each other via, for example, a wired cable in a manner of being capable of transmitting and receiving data therebetween.

Figure 15:
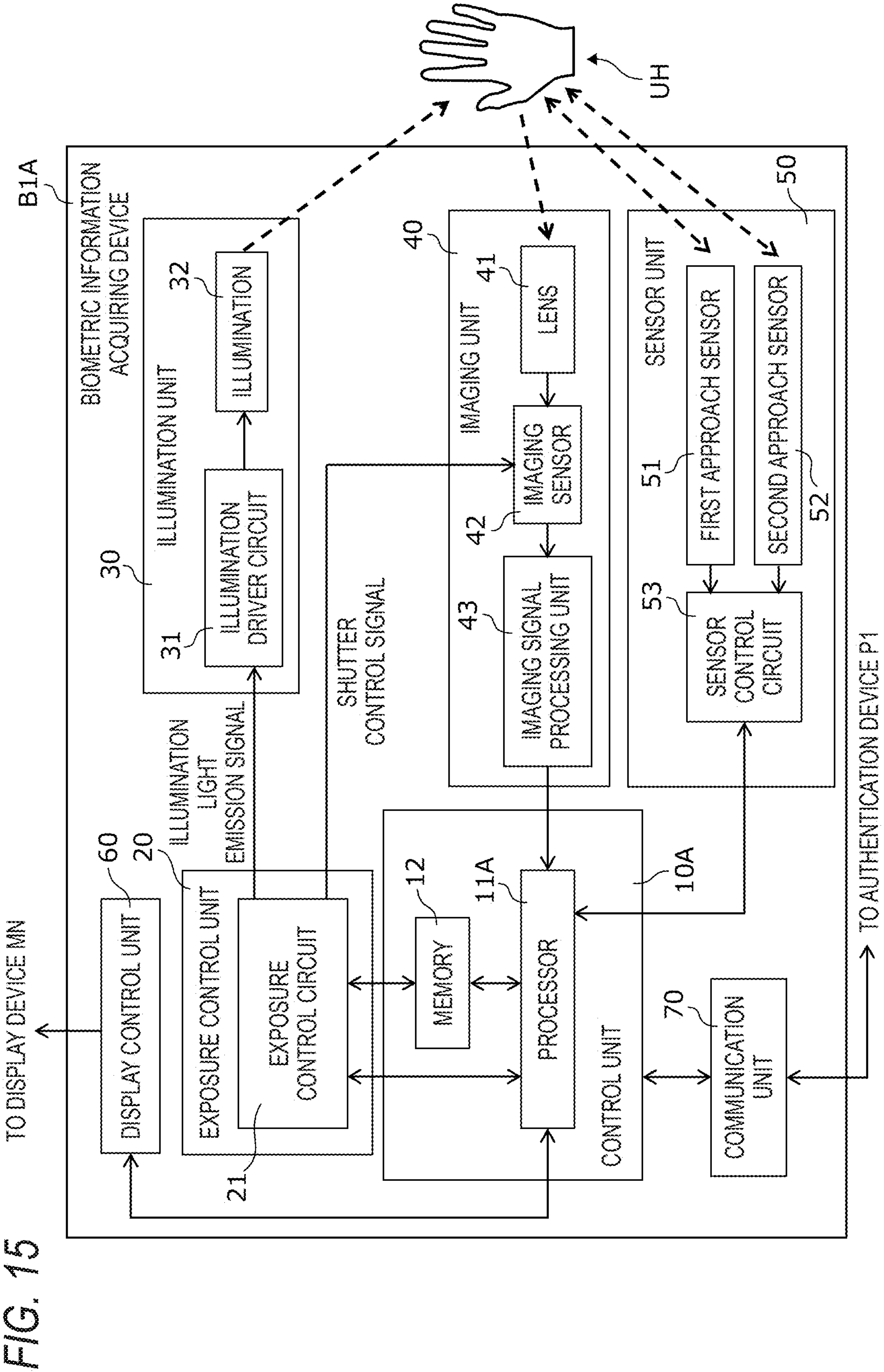
FIG. 15 is a block diagram illustrating an example of an internal configuration of the biometric information acquiring device according to the modification of the first embodiment.

An internal configuration of the biometric information acquiring device B1A will be described with reference to FIG. 15. FIG. 15 is a block diagram illustrating an example of the internal configuration of the biometric information acquiring device B1A according to the modification of the first embodiment. The inside of the housing 18 of the biometric information acquiring device B1A is the same as the inside of the housing 18 of the authentication device B1 illustrated in FIG. 2, and thus the description thereof is omitted.

The biometric information acquiring device BIA is made of metal or resin. The biometric information acquiring device B1A includes a control unit 10A, the glass surface 16, the housing 18, the exposure control unit 20, the illumination unit 30, the imaging unit 40, the sensor unit 50, the display control unit 60, and a communication unit 70.

The control unit 10A includes a processor 11A and the memory 12.

The processor 11A is implemented by using, for example, a CPU or an FPGA, and performs various kinds of processing and control in cooperation with the memory 12. Specifically, the processor 11A implements functions of the control unit 10A, the exposure control unit 20, the sensor unit 50, the display control unit 60, and the like by referring to a program and data stored in the memory 12 and executing the program.

The processor 11A causes the exposure control unit 20 to start control of the illumination unit 30 and the imaging unit 40 based on the first detection signal notifying of detection of the hand UH of the user output from the sensor unit 50.

The processor 11A causes the exposure control unit 20 to end the control of the illumination unit 30 and the imaging unit 40 based on the second detection signal notifying of detection of the hand UH of the user output from the sensor unit 50.

The processor 11A executes image processing on a captured image captured by the imaging unit 40 to extract feature data of the biometric information of the user. The processor 11A outputs the extracted feature data of the biometric information of the user to the communication unit 70, and causes the communication unit 70 to transmit the feature data to the authentication device P1.

The processor 11A acquires a biometric authentication result (a user authentication result) transmitted from the authentication device P1. Based on information of the acquired biometric authentication result, the processor 11A generates an authentication result screen that notifies of the biometric authentication result, outputs the authentication result screen to the display control unit 60, and causes the monitor MN to display the authentication result screen.

The communication unit 70 is connected to a communication unit 80 in the authentication device P1 in a manner of being capable of data communication. The communication unit 70 may be connected to the communication unit 80 in the authentication device P1 in a manner of wireless communication or wired communication. The communication unit 70 transmits the feature data of the biometric information of the user output from the processor 11A to the authentication device P1. The communication unit 70 outputs the biometric authentication result transmitted from the authentication device P1 to the processor 11A.

The feature data of the biometric information of the user and the information of the biometric authentication result transmitted and received by the communication unit 70 may be encrypted by processors 11A and 81.

Figure 16:
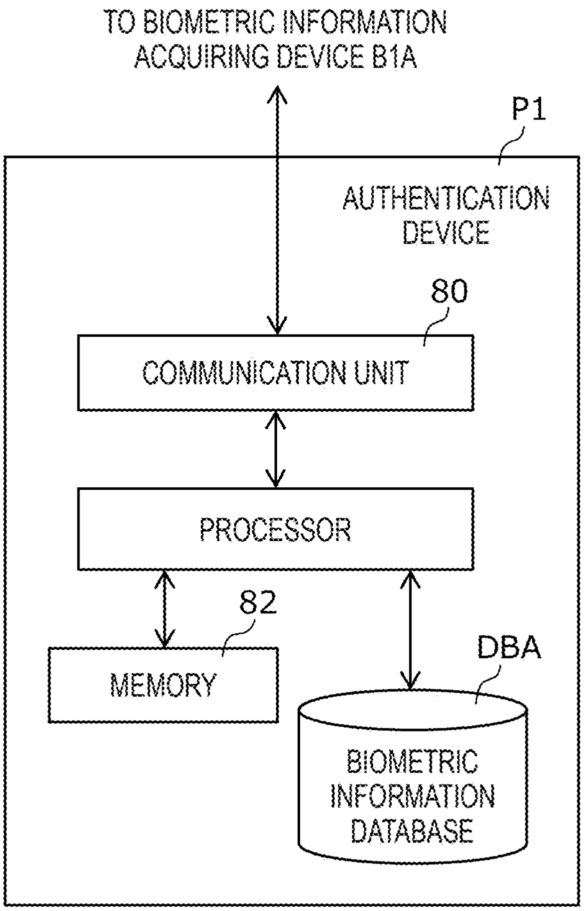
FIG. 16 is a block diagram illustrating an example of an internal configuration of an authentication device according to the modification of the first embodiment.

Next, an internal configuration of the authentication device P1 will be described with reference to FIG. 16. FIG. 16 is a block diagram illustrating an example of the internal configuration of the authentication device P1 according to the modification of the first embodiment.

The authentication device P1 includes the communication unit 80, the processor 81, a memory 82, and a biometric information database DBA. The biometric information database DBA may be implemented separately from the authentication device P1 and may be connected to the authentication device P1 in a manner of being capable of transmitting and receiving data therebetween.

The communication unit 80 is connected to the communication unit 70 in the Biometric information acquiring device B1A in a manner of wireless communication or wired communication, and executes transmission and reception of data. The communication unit 80 acquires the feature data of the biometric information of the user transmitted from the biometric information acquiring device B1A and outputs the feature data to the processor 81. The communication unit 80 transmits the information of the biometric authentication result output from the processor 81 to the biometric information acquiring device B1A.

The processor 81 is implemented by using, for example, a CPU or an FPGA, and performs various kinds of processing and control in cooperation with the memory 82. Specifically, the processor 81 implements functions of each unit by referring to a program and data stored in the memory 82 and executing the program.

The processor 81 executes user authentication (that is, biometric authentication) using the biometric information based on the feature data of the biometric information of the user and feature data of biometric information of each of a plurality of users previously registered (stored) in the biometric information database DBA. The processor 81 generates a biometric authentication result, outputs information of the biometric authentication result to the communication unit 80, and causes the communication unit 80 to transmit the biometric authentication result to the biometric information acquiring device B1A.

The memory 82 includes, for example, a RAM as a work memory used when each processing of the processor 81 is executed, and a ROM storing a program and data defining an operation of the processor 81. The RAM temporarily stores data or information generated or acquired by the processor 81. The program that defines the operation of the processor 81 is written into the ROM.

The biometric information database DBA is a storage medium device such as an HDD or an SSD, and stores biometric information of a plurality of users previously registered by an administrator. The biometric information stored in the biometric information database DBA is biometric information that enables biometric authentication such as a fingerprint or a vein of each of a plurality of fingers of the user, or a palm print of the user, and is stored in association with user information.

The biometric information in the modification of the first embodiment may be a captured image itself for extracting the feature data of the biometric information. In such a case, the biometric information acquiring device B1A according to the modification of the first embodiment may select at least one captured image containing biometric information for extracting feature data of the biometric information and transmit the selected captured image to the authentication device P1. The authentication device P1 may acquire the captured image that is transmitted from the biometric information acquiring device B1A and includes the biometric information of the user, and may extract the feature data of the biometric information of the user from the acquired captured image. The authentication device P1 executes biometric authentication (user authentication) by using the extracted feature data of the biometric information of the user.

Next, a correspondence relationship between the respective operation procedures illustrated in FIGS. 7 and 11 and the operation procedures of the biometric authentication systems 100 and 200 according to the respective embodiments will be described with reference to FIG. 17. FIG. 17 is the table TB3 illustrating the correspondence relationship between the operation procedures illustrated in FIGS. 7 and 11 and the operation procedures of the biometric authentication systems 100 and 200 according to the respective embodiments.

In the biometric authentication system 100 according to the first embodiment, the authentication device B1 executes the processing of steps St1-1 to St6-2, and the monitor MN executes the processing of steps St7-1 and St7-2.

In the biometric authentication system 200 according to the modification of the first embodiment, the biometric information acquiring device B1A executes the processing of steps St1-1 to St5-2, the authentication device P1 executes the processing of steps St6-1 and St6-2, and the monitor MN executes the processing of steps St7-1 and St7-2.

As described above, the authentication device B1 (an example of the biometric authentication device) according to the first embodiment includes: the imaging unit 40 configured to capture an image of at least a part of a hand of a user (an example of the person to be authenticated); the illumination unit 30 configured to illuminate the hand of the user; the exposure control unit 20 (an example of the control unit) configured to control at least one of the imaging unit 40 and the illumination unit 30 based on a plurality of different exposure conditions (an example of the exposure parameter); and the processor 11 (an example of the authentication unit) configured to extract biometric information of the user from each of a plurality of captured images, and authenticate the user based on the biometric information of the user and previously registered biometric information of each of a plurality of users. The plurality of captured images are captured by the imaging unit 40 according to each of the exposure conditions.

Accordingly, in the authentication device B1 according to the first embodiment, even when there is a variation in the height of the hand of the user (that is, the imaging distance), the exposure (light amount) in capturing one image can be adjusted, images in which the biometric luminance values of biometric authentication sites (for example, a finger, or a palm) shown in the captured image are different can be captured, and thus a captured image captured at a brightness more suitable for extraction of the biometric information can be acquired.

The imaging unit 40 in the authentication device B1 according to the first embodiment includes a shutter. The plurality of exposure conditions are different form each other in a shutter speed of the shutter. Accordingly, the authentication device B1 according to the first embodiment can acquire captured images with different exposures (light amounts) by changing the shutter speed based on a plurality of previously set shutter speed conditions (exposure conditions). Accordingly, the authentication device B1 can more efficiently acquire captured images captured with a brightness (biometric luminance value) suitable for extraction of biometric information.

The plurality of exposure conditions in the authentication device B1 according to the first embodiment are parameters related to light emission control of the illumination unit 30. Accordingly, the authentication device B1 according to the first embodiment can acquire captured images with different exposures (light amounts) by executing the light emission control of the illumination 32 based on a plurality of previously set illumination conditions (exposure conditions). Accordingly, the authentication device B1 can more efficiently acquire captured images captured with a brightness (biometric luminance value) suitable for extraction of biometric information.

The plurality of exposure conditions in the authentication device B1 according to the first embodiment are different from each other in a light emission time of the illumination unit 30. Accordingly, the authentication device B1 according to the first embodiment can acquire captured images with different exposures (light amounts) by controlling the illumination light emission time of the illumination 32 based on a plurality of previously set illumination conditions (exposure conditions). Accordingly, the authentication device B1 can more efficiently acquire captured images captured with a brightness (biometric luminance value) suitable for extraction of biometric information.

The plurality of exposure conditions in the authentication device B1 according to the first embodiment are constant in a light emission intensity of the illumination unit 30 and different from each other in a light emission time of the illumination unit 30. Accordingly, the authentication device B1 according to the first embodiment can more easily acquire captured images with different exposures (light amounts) by controlling the illumination light emission time of the illumination 32 (that is, controlling the illumination to be turned on and off) based on a plurality of previously set illumination conditions (exposure conditions). Accordingly, the authentication device B1 can more efficiently acquire captured images captured with a brightness (biometric luminance value) suitable for extraction of biometric information.

The imaging unit 40 in the authentication device B1 according to the first embodiment includes a shutter. The plurality of exposure conditions are parameters related to at least one of a shutter speed of the shutter or a light emission time of the illumination unit 30. Accordingly, the authentication device B1 according to the first embodiment can acquire captured images with different exposures (light amounts) by executing the light emission control of the illumination 32 or changing the shutter speed of the shutter based on a plurality of previously set exposure conditions. Accordingly, the authentication device B1 can more efficiently acquire captured images captured with a brightness (biometric luminance value) suitable for extraction of biometric information.

The plurality of exposure conditions in the authentication device B1 according to the first embodiment are different from each other in a first timing for starting the shutter or a second timing for turning on the illumination unit 30. Accordingly, the authentication device B1 according to the first embodiment can acquire captured images with different exposures (light amounts) by respectively controlling an output timing of the shutter opening signal (trigger signal) for bringing the shutter into the open state (exposed state) and an output timing of the light emission start signal (trigger signal) for turning on the illumination unit 30. Accordingly, the authentication device B1 can more efficiently acquire captured images captured with a brightness (biometric luminance value) suitable for extraction of biometric information.

In response to the plurality of exposure conditions being conditions related to the shutter speed, the exposure control unit 20 in the authentication device B1 according to the first embodiment turns on the illumination unit 30 and then captures an image of the hand according to each of the exposure conditions. As a result, the authentication device B1 according to the first embodiment can acquire captured images with different exposures (light amounts) by executing control to change the shutter speed of the shutter without executing the ON/OFF control of the illumination unit 30 during capturing an image. Accordingly, the authentication device B1 can more efficiently acquire captured images captured with a brightness (biometric luminance value) suitable for extraction of biometric information.

In response to the plurality of exposure conditions being conditions related to the light emission time, the exposure control unit 20 in the authentication device B1 according to the first embodiment starts start control of the shutter and then captures an image of the hand according to each of the exposure conditions. Accordingly, the authentication device B1 according to the first embodiment can more easily acquire captured images with different exposures (light amounts) by simply controlling the start and end of the shutter at a constant shutter speed and by controlling the illumination light emission time of the illumination 32 (that is, controlling the illumination to be turned on and off). Accordingly, the authentication device B1 can more efficiently acquire captured images captured with a brightness (biometric luminance value) suitable for extraction of biometric information.

The authentication device B1 according to the first embodiment further includes the first approach sensor 51 (an example of the first sensor) configured to detect entry of the hand UH into an imaging area of the imaging unit 40. The exposure control unit 20 is configured to start control of the imaging unit 40 and the illumination unit 30 at a timing at which the entry of the hand UH is detected by the first approach sensor 51. The imaging unit 40 is configured to capture an image of the hand UH according to each of the exposure conditions. As a result, the authentication device B1 according to the first embodiment starts the exposure control from a timing at which the imaging unit 40 becomes capable of capturing an image of the hand UH of the user, and thus an increase in power consumption of the authentication device B1 can be more effectively prevented.

The authentication device B1 according to the first embodiment further includes the second approach sensor 52 (an example of the second sensor) configured to detect removal of the hand UH from the imaging area of the imaging unit 40. The exposure control unit 20 is configured to end the control of the imaging unit 40 and the illumination unit 30 at a timing at which the removal of the hand UH is detected by the second sensor. Accordingly, the authentication device B1 according to the first embodiment ends the exposure control at a timing at which the imaging unit 40 is no longer able to capture an image of the hand UH of the user, and thus an increase in power consumption of the authentication device B1 can be more effectively prevented.

As described above, the biometric authentication system 200 according to the modification of the first embodiment includes the biometric information acquiring device BIA configured to acquire biometric information of a user (an example of the person to be authenticated); and the authentication device P1 configured to communicate with the biometric information acquiring device B1A. The biometric information acquiring device B1A is configured to control at least one of the imaging unit 40 (an example of the camera) and the illumination 32 based on a plurality of different exposure conditions (an example of the exposure parameter), capture an image of the hand UH of the user according to each of the exposure conditions, and acquire the biometric information of the user from each of a plurality of captured images, and transmit the biometric information to the authentication device P1. The authentication device P1 is configured to authenticate the user based on the biometric information of the user transmitted from the biometric information acquiring device B1A and previously registered biometric information of each of a plurality of users.

Accordingly, in the biometric authentication system 200 according to the modification of the first embodiment, even when there is a variation in the height of the hand of the user (that is, the imaging distance), the exposure (light amount) in capturing one image can be adjusted, images in which the biometric luminance values of biometric authentication sites (for example, a finger, or a palm) shown in the captured image are different can be captured, and thus a captured image captured at a brightness more suitable for extraction of the biometric information can be acquired.

Although various embodiments have been described above with reference to the accompanying drawings, the present disclosure is not limited thereto. It is apparent to a person skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the various embodiments described above may be freely combined without departing from the gist of the disclosure.

The present application is based on Japanese Patent Application No. 2022-075296 filed on Apr. 28, 2022, and the contents thereof are incorporated herein by reference.

INDUSTRIAL APPLICABILITY

The present disclosure is useful for providing a biometric authentication device, a biometric authentication method, and a biometric authentication system for capturing an image more suitable for biometric authentication.

REFERENCE SIGNS LIST

10, 10A: control unit
11, 11A, 81: processor
12, 82: memory
17: cover guide
18: housing
18A: housing upper surface
20: exposure control unit
30: illumination unit
32: illumination
40: imaging unit
41: lens
42: imaging sensor
50: sensor unit
51: first approach sensor
52: second approach sensor
60: display control unit
100, 200: biometric authentication system
B1: authentication device
B1A: biometric information acquiring device
DB, DBA: biometric information database
IMG01, IMG02, IMG03, IMG11, IMG12, IMG13: captured image
MN: monitor
P1: authentication device

The invention claimed is:

1. A biometric authentication device, comprising:
a camera configured to capture an image of at least a part of a hand of a person to be authenticated;
a light configured to illuminate the hand of the person to be authenticated; and
processor configured to;
control at least one of the camera or the light based on a plurality of different exposure parameters; and
extract biometric information of the person to be authenticated from each of a plurality of captured images, and authenticate the person to be authenticated based on the biometric information of the person to be authenticated and previously registered biometric information of each of a plurality of persons to be authenticated, wherein
the plurality of captured images is captured by the camera according to each of the plurality of different exposure parameters,
the camera includes a shutter, and
each of the plurality of different exposure parameters is different in a shutter speed of the shutter.

2. The biometric authentication device according to claim 1, wherein
the plurality of different exposure parameters include parameters related to light emission control of the light.

3. The biometric authentication device according to claim 2, wherein
each of the plurality of different exposure parameters is different in a light emission time of the light.

4. The biometric authentication device according to claim 2, wherein
each of the plurality of different exposure parameters is constant in a light emission intensity of the light and different in a light emission time of the light.

5. The biometric authentication device according to claim 1, wherein
the plurality of different exposure parameters includes parameters related to at least one of the shutter speed of the shutter or a light emission time of the light.

6. The biometric authentication device according to claim 5, wherein
each of the plurality of different exposure parameters is different in a first timing for starting the shutter or a second timing for turning on the light.

7. The biometric authentication device according to claim 5, wherein
in response to the plurality of different exposure parameters being conditions related to the shutter speed, the processor turns on the light and then captures the image of the at least part of the hand according to each of the plurality of different exposure parameters.

8. The biometric authentication device according to claim 5, wherein
in response to the plurality of different exposure parameters being conditions related to the light emission time, the processor starts start/end control of the shutter and then captures the image of the at least part of the hand according to each of the plurality of different exposure parameters.

9. The biometric authentication device according to claim 1, further comprising:
a first sensor configured to detect entry of the hand into an imaging area of the camera, wherein
the processor is configured to start control of the camera and the light at a first timing at which the entry of the hand is detected by the first sensor, and
the camera is configured to capture the image of the at least part of the hand according to each of the plurality of different exposure parameters.

10. The biometric authentication device according to claim 9, further comprising:
a second sensor configured to detect removal of the hand from the imaging area of the camera, wherein
the processor is configured to end the control of the camera and the light at a second timing at which the removal of the hand is detected by the second sensor.

11. A biometric authentication system, comprising:
a biometric information acquiring device configured to acquire biometric information of a person to be authenticated; and
an authentication device configured to communicate with the biometric information acquiring device, wherein
the biometric information acquiring device is configured to
control at least one of a camera or a light based on a plurality of different exposure parameters, capture an image of at least a part of a hand of the person to be authenticated according to each of the plurality of different exposure parameters, and acquire the biometric information of the person to be authenticated from each of a plurality of captured images, and transmit the biometric information to the authentication device, and the authentication device is configured to authenticate the person to be authenticated based on the biometric information of the person to be authenticated transmitted from the biometric information acquiring device and previously registered biometric information of each of a plurality of persons to be authenticated, wherein the camera includes a shutter, and each of the plurality of different exposure parameters is different in a shutter speed of the shutter.

12. A biometric authentication device, comprising:

a camera configured to capture an image of at least a part of a hand of a person to be authenticated;

a light configured to illuminate the hand of the person to be authenticated; and a processor configured to:

control at least one of the camera or the light based on a plurality of different exposure parameters; and extract biometric information of the person to be authenticated from each of a plurality of captured images, and authenticate the person to be authenticated based on the biometric information of the person to be authenticated and previously registered biometric information of each of a plurality of persons to be authenticated, wherein the plurality of captured images is captured by the camera according to each of the plurality of different exposure parameters, and the plurality of different exposure parameters include parameters related to light emission control of the light.

13. A biometric authentication system, comprising:

a biometric information acquiring device configured to acquire biometric information of a person to be authenticated; and an authentication device configured to communicate with the biometric information acquiring device, wherein the biometric information acquiring device is configured to control at least one of a camera or a light based on a plurality of different exposure parameters, capture an image of at least a part of a hand of the person to be authenticated according to each of the plurality of different exposure parameters, and acquire the biometric information of the person to be authenticated from each of a plurality of captured images, and transmit the biometric information to the authentication device, and the authentication device is configured to authenticate the person to be authenticated based on the biometric information of the person to be authenticated transmitted from the biometric information acquiring device and previously registered biometric information of each of a plurality of persons to be authenticated, wherein the plurality of different exposure parameters include parameters related to light emission control of the light.

* * * * *